United States Patent [19]
Baba

[11] Patent Number: 4,801,829
[45] Date of Patent: Jan. 31, 1989

[54] ELECTROMAGNETIC MOTOR WITHOUT MECHANICAL MOTION CONVERTER

[75] Inventor: Mitsuru Baba, Hamamatsu, Japan

[73] Assignee: Yamaha Corporation, Hamamatsu, Japan

[21] Appl. No.: 122,792

[22] Filed: Nov. 19, 1987

[30] Foreign Application Priority Data

| Nov. 20, 1986 | [JP] | Japan | 61-277589 |
| Nov. 22, 1986 | [JP] | Japan | 61-279330 |
| Nov. 28, 1986 | [JP] | Japan | 61-285127 |
| Nov. 28, 1986 | [JP] | Japan | 61-285128 |
| Jan. 30, 1987 | [JP] | Japan | 62-19697 |

[51] Int. Cl.$^4$ .............................. H02K 33/12
[52] U.S. Cl. .................... 310/10; 310/36; 310/328
[58] Field of Search .......... 310/10, 12, 15, 36, 310/328, 37

[56] References Cited

U.S. PATENT DOCUMENTS

| 4,455,501 | 6/1984 | Tojo et al. | 310/328 |
| 4,492,891 | 1/1985 | Wieters | 310/328 |
| 4,638,193 | 1/1987 | Jones | 310/15 |

*Primary Examiner*—Peter S. Wong
*Assistant Examiner*—D. L. Rebsch
*Attorney, Agent, or Firm*—Blakely, Sokoloff, Taylor & Zafman

[57] ABSTRACT

An electromagnetic motor constituted by a movable member, a flexible support member, a first fixed magnetic pole, and a second fixed magnetic pole. The movable member is magnetized to form N and S poles on opposing surfaces. One end of the flexible support member is connected to the movable member, and the other end thereof is connected to a base. The first fixed magnetic pole is so arranged as to apply a magnetic force in a direction parallel to the N and S poles of the movable member. The second fixed magnetic pole is so arranged as to apply a magnetic force in a direction perpendicular to the N and S poles of the movable member.

23 Claims, 23 Drawing Sheets

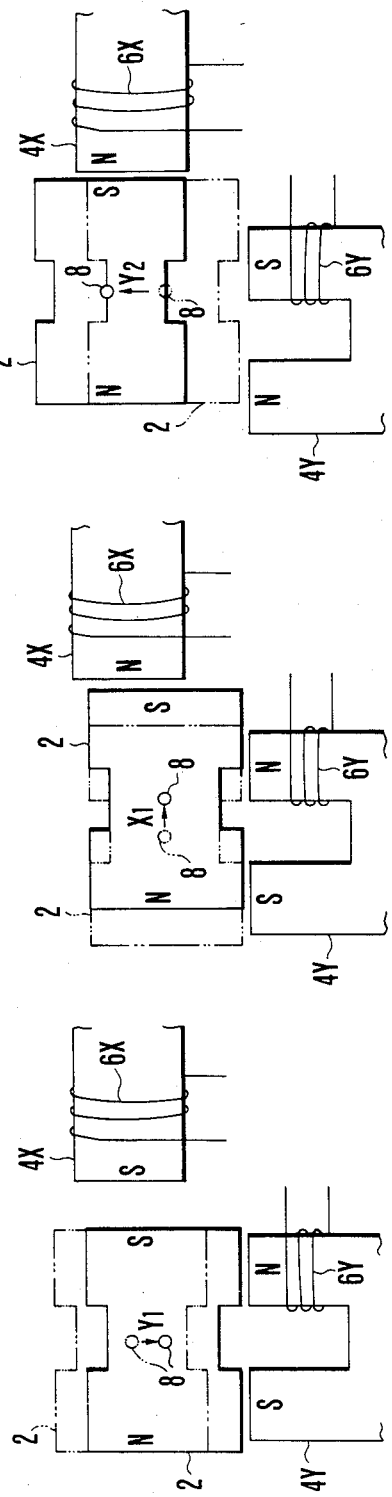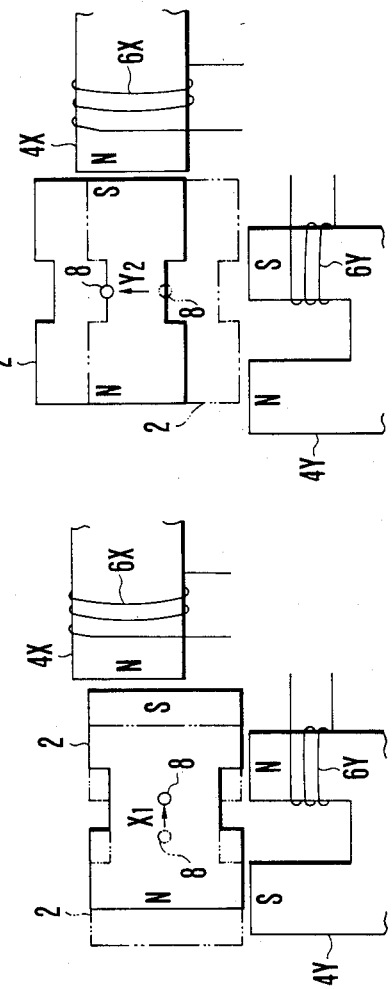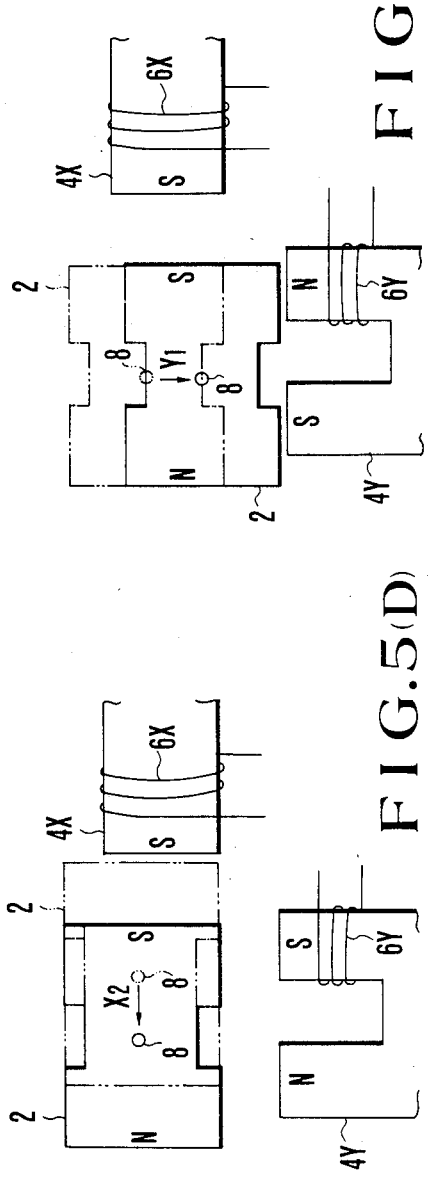
FIG.5(A)  FIG.5(B)  FIG.5(C)  FIG.5(D)  FIG.5(E)

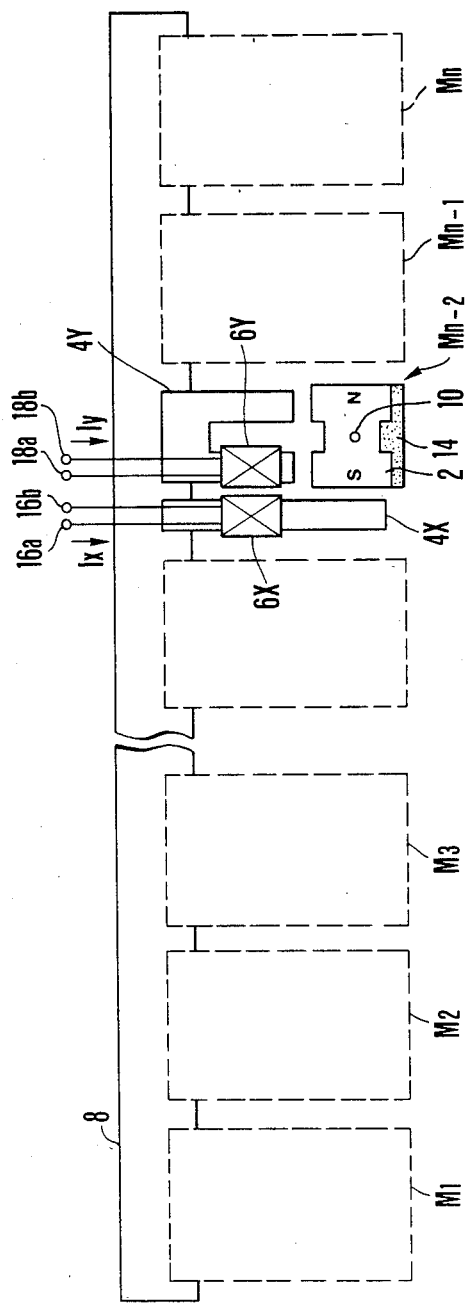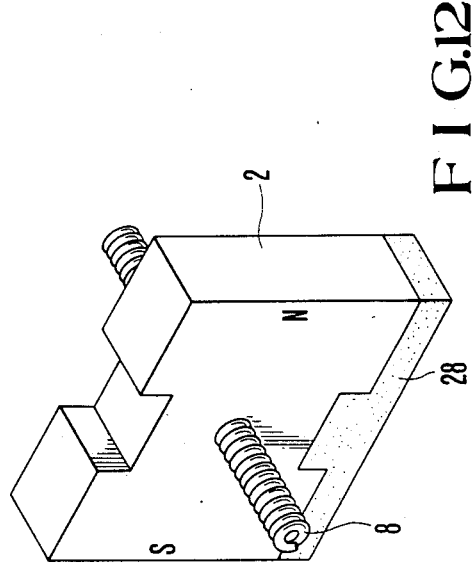

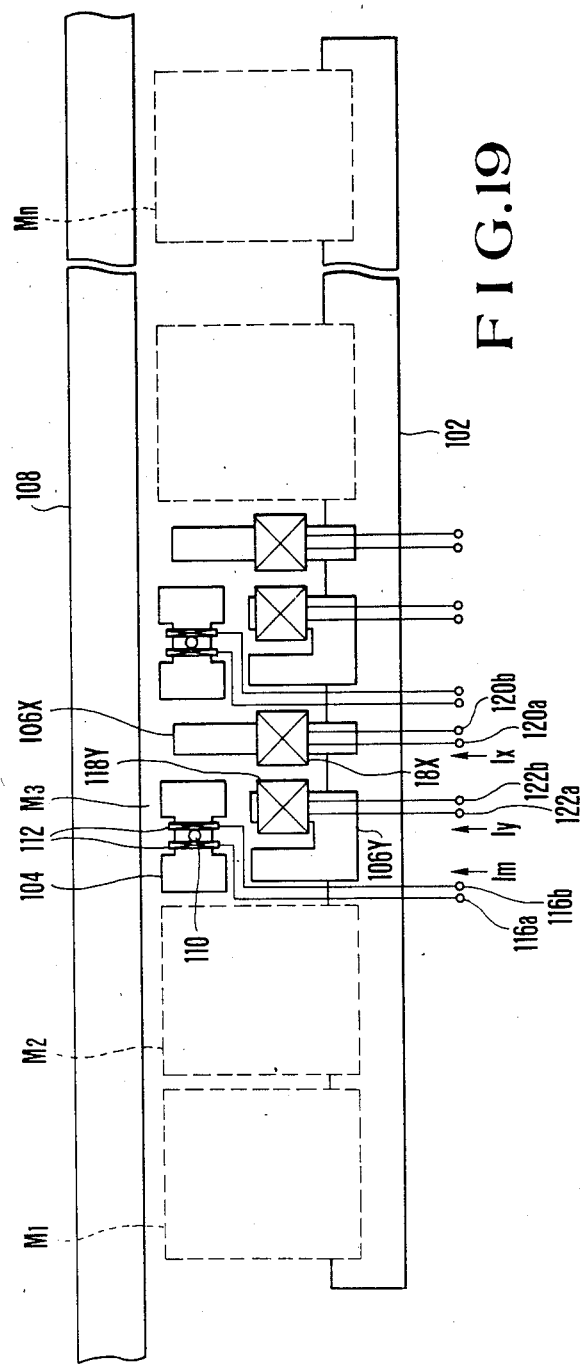
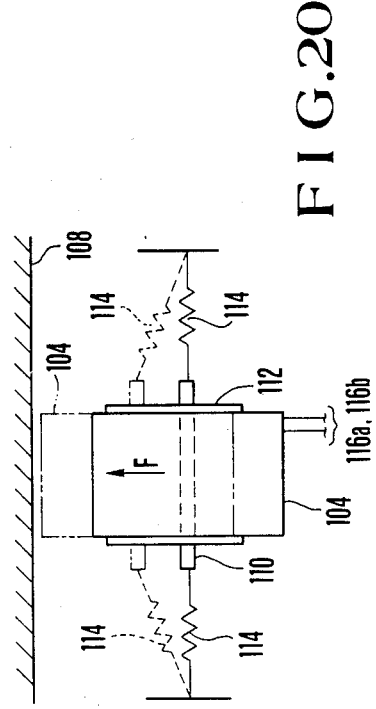

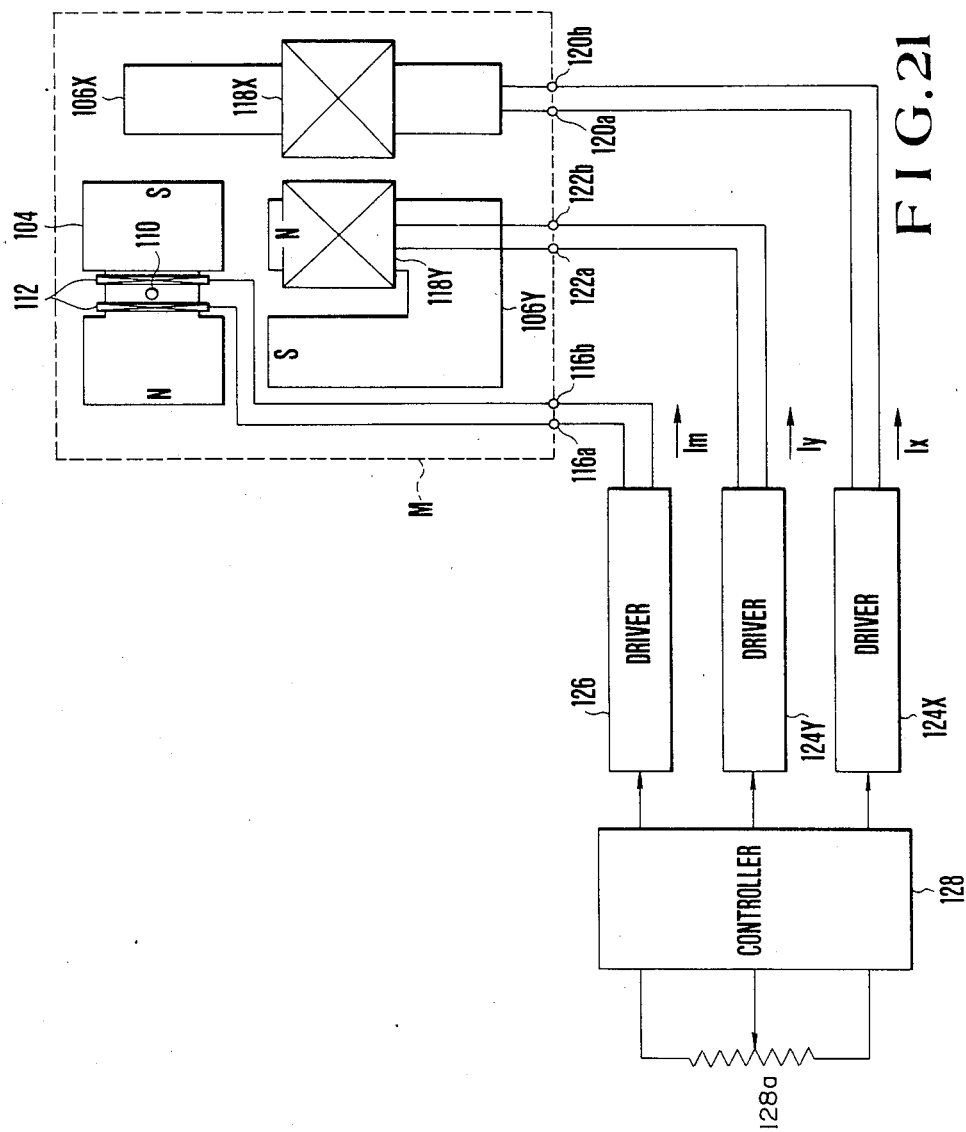

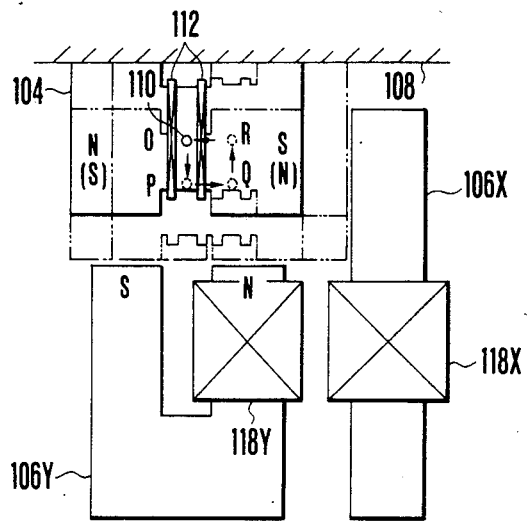
FIG.24
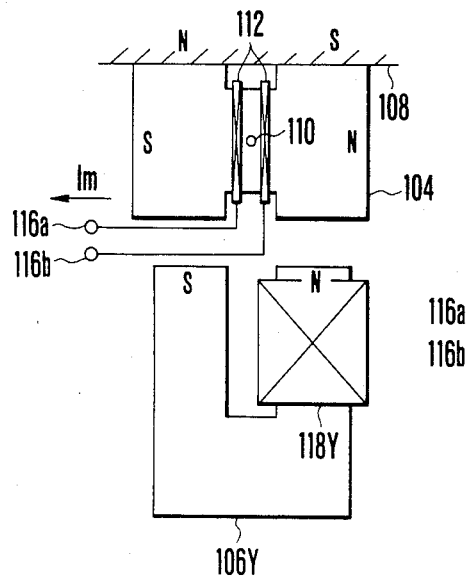 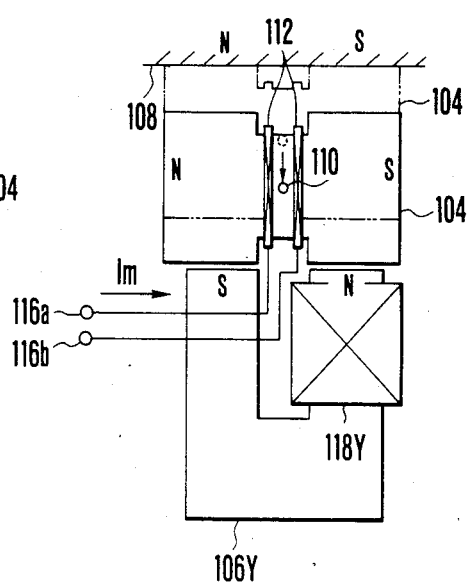
FIG.25(A)   FIG.25(B)

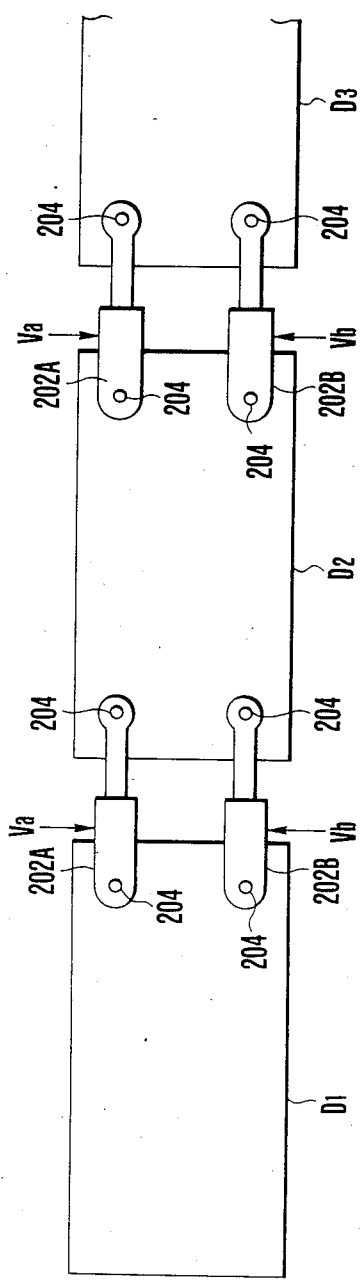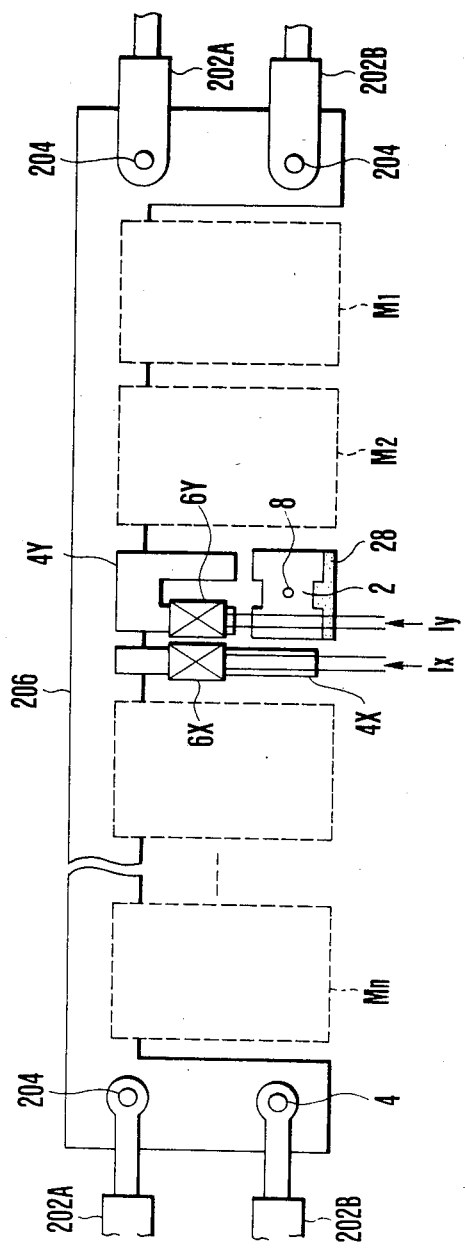
FIG. 28(A)
FIG. 28(B)

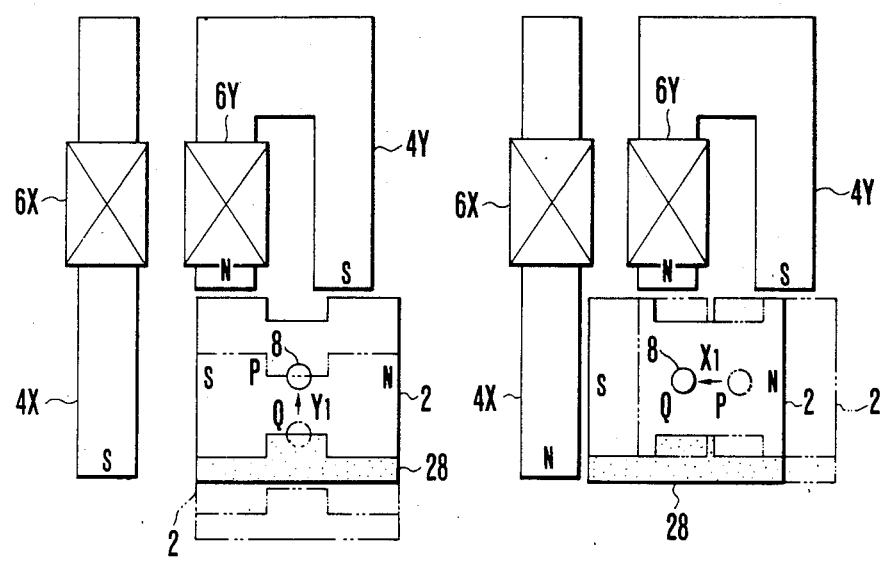
F I G. 30(A)   F I G. 30(B)
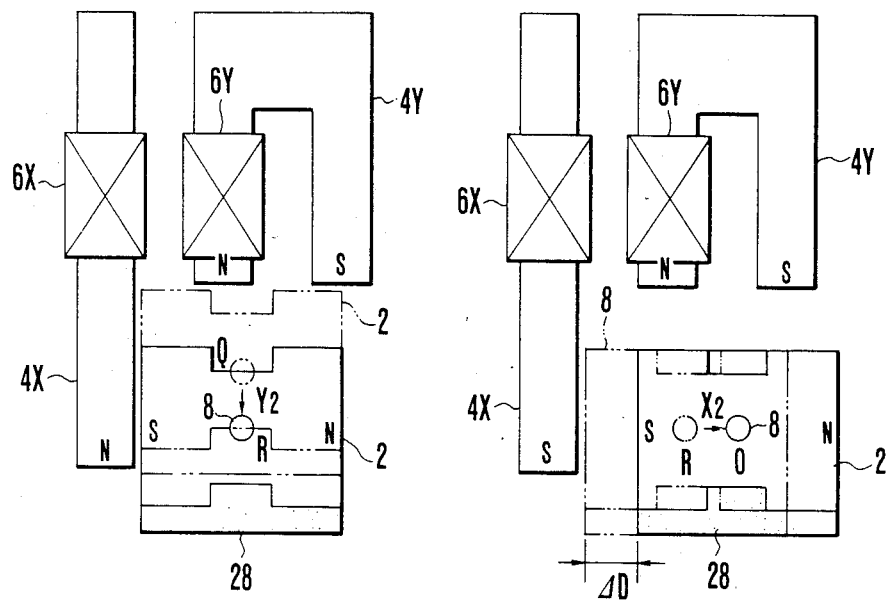
F I G. 30(C)   F I G. 30(D)

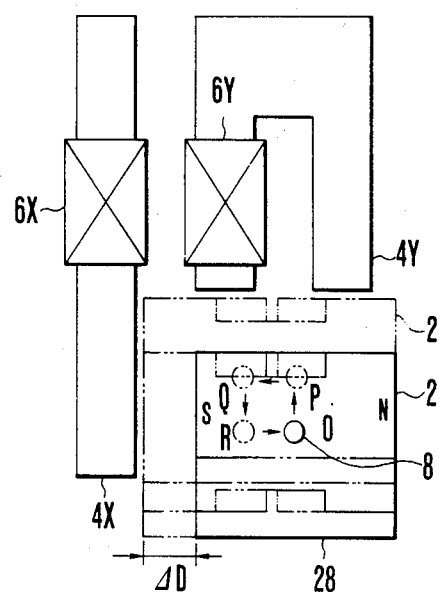
F I G. 31
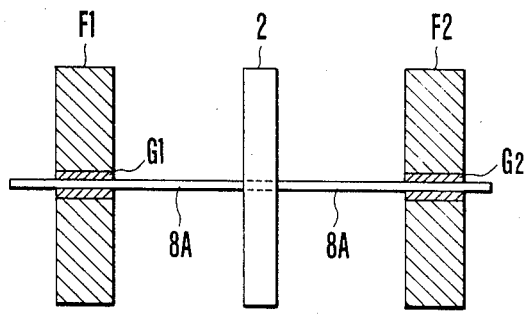
F I G. 34

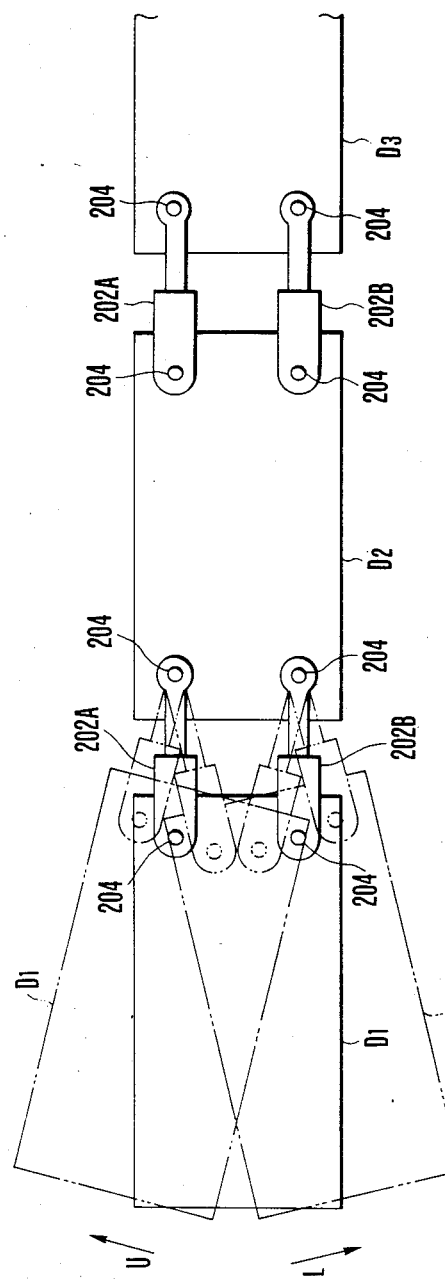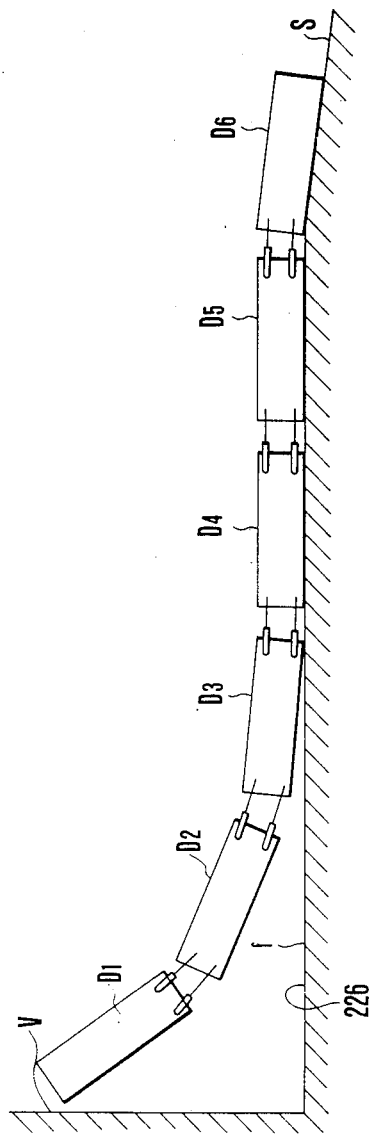

ELECTROMAGNETIC MOTOR WITHOUT MECHANICAL MOTION CONVERTER

BACKGROUND OF THE INVENTION

The present invention relates to a motor.

Conventionally, in order to obtain displacements in the X and Y directions, a mechanical motion converting means such as a gear for converting rotation into linear motion is generally used.

When such a mechanical motion converting means is used, a mechanical loss is generated because the converting means is interposed. Therefore, in order to accurately control displacing directions or displacing amounts, a control apparatus is enlarged. In addition, since the mechanical loss is generated, controllability or the like is degraded.

Therefore, the present invention aims to obtain drive displacements in the X and Y directions by an electromagnetic force without a mechanical motion converting means.

SUMMARY OF THE INVENTION

It is, therefore, a principal object of the present invention to provide a motor which can rotate with an extremely simple arrangement and without a mechanical motion converting means.

It is still another object of the present invention to provide a motor which can achieve the above object and can produce highly controllable rotary motion whose speed and drive force can be easily, finely, and accurately controlled.

It is still another object of the present invention to provide a motor which can produce a drive force in a given direction.

In order to achieve the above objects of the present invention, there is provided a motor comprising: a movable member magnetized to form N and S poles on opposing surfaces; a flexible support member, one end of which is connected to the movable member, and the other end of which is connected to a base; a first fixed magnetic pole, arranged in an situated in a position such that the magnetic force of the first fixed magnetic pole is parallel to the N and S poles of the movable member; and a second fixed magnetic pole situated in a position such that the magnetic force of the second fixed magnetic pole is perpendicular to the N and S poles of the movable member.

BRIEF DESCRIPTION OF THE DRAWINGS

FIGS. 5(A) to 5(E) are views of a rotary motion track of the movable magnetic pole of the motor shown in FIG. 1;

FIG. 12 is a perspective view of a modification of the movable magnetic pole used in the present invention;

FIG. 13 is a view of still another embodiment of the present invention;

FIG. 19 is a view of an embodiment of the moving body of the present invention;

FIG. 20 is a view of a form of supporting the movable magnetic pole of the motor unit;

FIG. 21 is a block diagram of a drive control apparatus of the motor unit;

FIG. 24 is a view of rotary motion of the motor unit;

FIGS. 25(A) and 25(B) are views of attraction/repulsion of a moving path of the movable magnetic pole;

FIGS. 28(A) and 28(B) are views of the moving body of still another embodiment of the present invention and its drive unit, respectively;

FIGS. 30(A) to 30(D) are views of a rotary motion track of the movable magnetic pole of the motor;

FIG. 31 is a view of rotary motion of the motor;

FIG. 32 is a view of a moving direction of the drive unit;

FIG. 33 is a view of movement of the moving body of the present invention; and

FIG. 34 is a view of still another modification of the present invention.

DESCRIPTION OF THE PREFERRED EMBODIMENTS

Preferred embodiments of the present invention will be described below with reference to the accompanying drawings.

Figure 1:
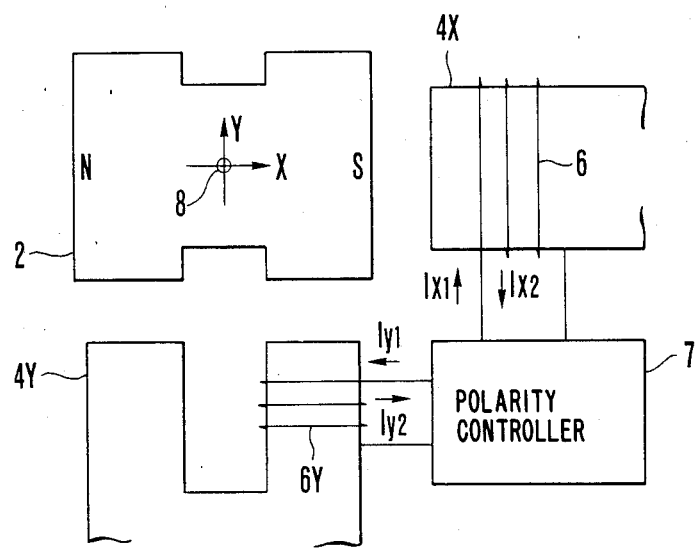
FIG. 1 is a view of an embodiment of a motor according to the present invention.

In order to achieve the above objects, a motor of the present invention comprises, as shown in FIG. 1, a movable magnetic pole 2 which can be moved in X and Y directions, a first fixed magnetic pole 4X for applying a magnetic force in the X direction to the movable magnetic pole 2, and a second fixed magnetic pole 4Y for applying a magnetic force in the Y direction thereto.

Therefore, in the motor of the present invention, under control of a drive apparatus, the movable magnetic pole 2 which can be moved in the X and Y directions generates an attracting force or a repulsing force in the X direction due to the magnetic force applied by the first fixed magnetic pole 4X, and generates an attracting force or a repulsing force in the Y direction due to the magnetic force applied by the second fixed magnetic pole 4Y. For this reason, by changing polarities of the fixed magnetic poles 4X and 4Y, an attracting force, an attracting force, a repulsing force, and a repulsing force respectively caused by the second fixed magnetic pole 4Y, the first fixed magnetic pole 4X, the second fixed magnetic pole 4Y, and the first fixed magnetic pole 4X can be obtained with respect to the movable magnetic pole 2. Therefore, in accordance with these attracting and repulsing forces, the movable magnetic pole 2 moves in the X and Y directions, thereby generating rotary motion.

When the first and second fixed magnetic poles 4X and 4Y are electromagnets around which drive coils 6X and 6Y are wound, respectively, and a drive current having a specific phase angle flows through each of the drive coils 6X and 6Y to apply the attracting or repulsing force to the movable magnetic pole 2, the attracting or repulsing force required for rotary motion can be obtained from each of the first and second fixed magnetic poles 4X and 4Y with respect to the movable magnetic pole 2. Therefore, the movable magnetic pole 2 can be successively rotated.

Referring to FIG. 1, the motor of the present invention will be described in more detail.

Figure 2:
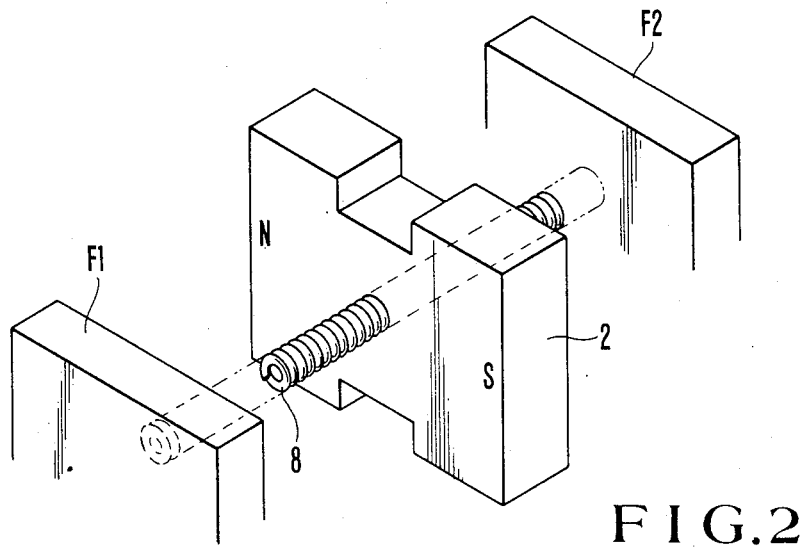
FIG. 2 is a view of a form of supporting a movable magnetic pole of the motor shown in FIG. 1.

The movable magnetic pole 2, constituted by a permanent magnet having a pair of magnetic poles N and S, is mounted to a flexible shaft which allows the movable magnetic pole 2 to move two-dimensionally in the X and Y directions. The flexible shaft is such that the movable magnetic poles return to their origin once the drive force is removed from the fixed magnetic poles. That is, as shown in FIG. 2, the movable magnetic pole 2 is fixed such that a flexible shaft 8 constituted by a coil spring extends therethrough, and both ends of the flexible shaft 8 are fixed on frames F1 and F2 in the motor. Therefore, when the movable magnetic pole 2 receives a drive force caused by a magnetic force in the X or Y direction, the flexible shaft 8 flexes to allow movement of the movable magnetic pole 2. When the drive force to the movable magnetic pole 2 is released, the movable magnetic pole 2 returns to the origin by a restoration force of the flexible shaft 8.

The first fixed magnetic pole 4X is so arranged as to produce a magnetic force to the movable magnetic pole 2 in the X direction, and the second fixed magnetic pole 4Y is so arranged as to produce a magnetic force to the movable magnetic pole 2 in the Y direction.

The fixed magnetic pole 4X is constituted by a unipolar electromagnet. The direction of the polarity of the electromagnet is controlled by changing the direction of the drive current flowing through the drive coil 6X which is wound around the electromagnet, i.e., drive currents Ix1 and Ix2.

The fixed magnetic pole 4Y is constituted by a dipolar electromagnet. Left and right polarities of the electromagnets are controlled by changing the direction of the drive current flowing through the drive coil 6Y which is wound around one of magnetic poles of the electromagnet, i.e., drive currents Iy1 and Iy2.

In the above arrangement, when the drive current Ix1 flows flowed through the drive coil 6X, an N pole is generated on a magnetic pole surface of the fixed magnetic pole 4X facing the movable magnetic pole 2 by magnetization. Therefore, an attracting force acts on the movable magnetic pole 2 to move it in a positive X direction. When the drive current Ix2 is flowed through the drive coil 6X, an S pole is generated on a magnetic pole surface of the fixed magnetic pole 4X facing the movable magnetic pole 2. Therefore, a repulsing force acts on the movable magnetic pole 2 to move it in a negative X direction.

When the drive current Iy1 is flowed through the drive coil 6Y, an N pole is generated on the left magnetic pole surface of the fixed magnetic pole 4Y, and an S pole is generated on the right magnetic pole surface thereof. Therefore, a repulsing force acts on the movable magnetic pole 2 to move it in a positive Y direction. When the drive current Iy2 flows through the drive coil 6Y, an S pole is generated on the left magnetic pole surface of the fixed magnetic pole 4Y, and an N pole is generated on the right magnetic pole surface thereof. Therefore, an attracting force acts on the movable magnetic pole 2 to move it in a negative Y direction.

Thus, the movable magnetic pole 2 is moved in the X or Y direction by an attracting or repulsing force generated by changing polarities of the fixed magnetic poles 4X and 4Y with respect to the movable magnetic pole 2, and by combining moving directions, the movable magnetic pole 2 can be rotated.

Figure 3:
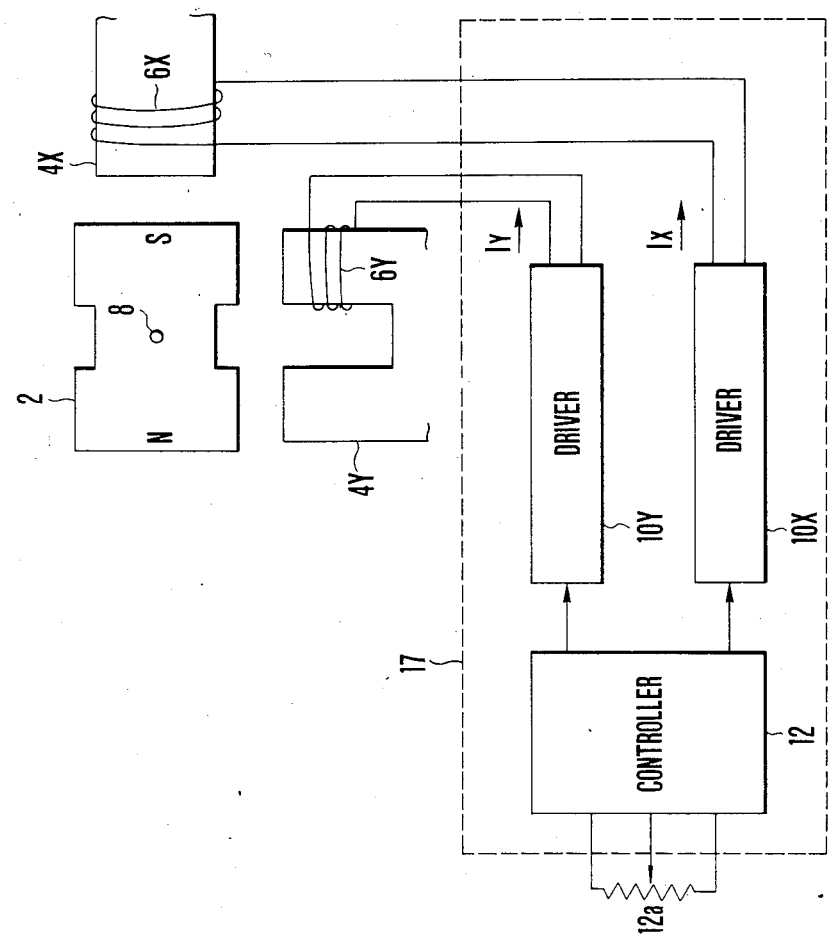
FIG. 3 is a block diagram of a drive control apparatus of the motor shown in FIG. 1.

Therefore, as shown in FIG. 3, as a drive apparatus for the movable magnetic pole, a driver 10X is arranged to supply the drive current Ix to the drive coil 6X, and a driver 10Y is arranged to supply the drive current Iy to the drive coil 6Y. In this case, generation timings of the drive currents Ix and Iy respectively flowed from the drivers 10X and 10Y are controlled by a controller 12.

Figure 4:
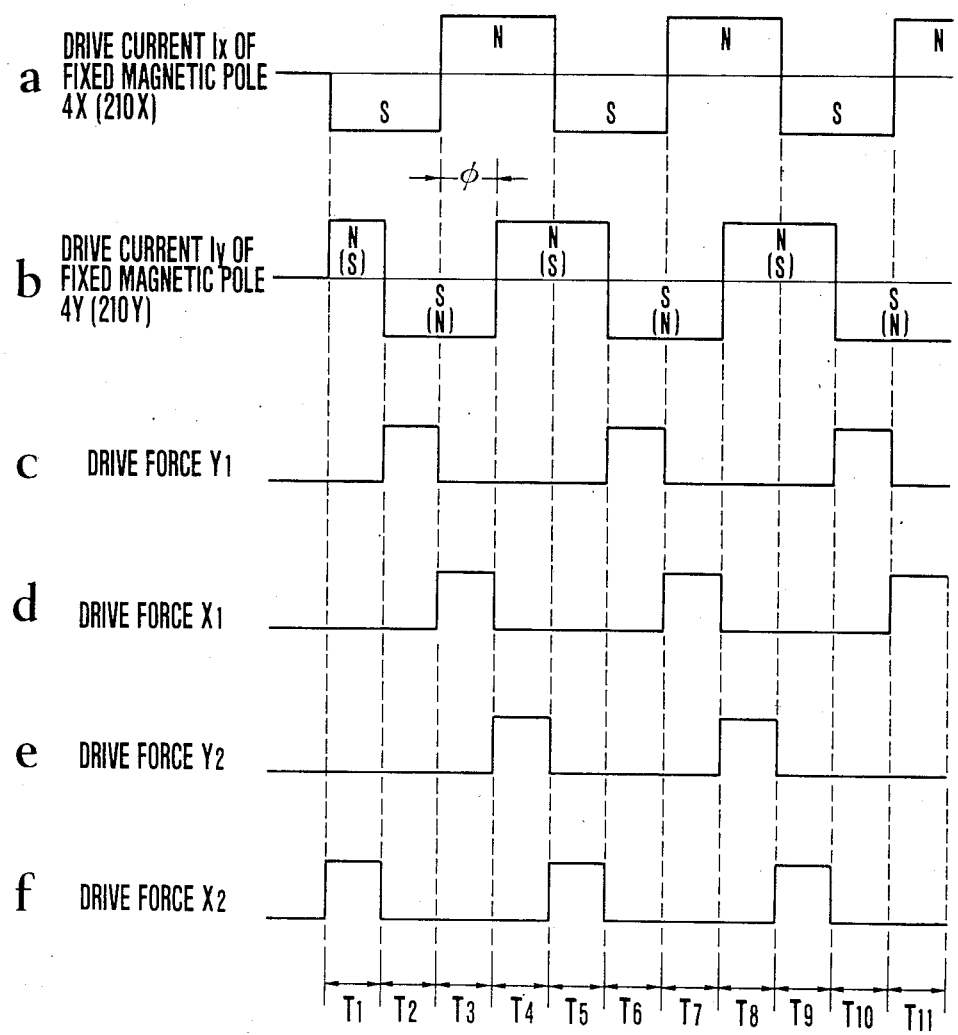
FIG. 4 is a timing chart of drive currents and drive forces of the motor shown in FIG. 1.

The drive current Ix flows from the driver 10X to the drive coil 6X as represented by a in FIG. 4, and the drive current Iy whose phase $\phi$ is shifted $\pi/2$ with respect to the drive current Ix flows from the driver 10y to the drive coil 6Y as indicated by b in FIG. 4. As a result, magnetic poles S and N represented by a in FIG. 4 are alternated on the magnetic pole surface of the fixed magnetic pole 4X by the drive current Ix at a predetermined period, and magnetic poles N and S represented by b in FIG. 4 are alternated on the left magnetic pole surface of the fixed magnetic pole 4Y by the drive current Iy at a predetermined period (in this case, opposite magnetic poles S and N shown in parentheses are generated on the right magnetic pole surface thereof).

That is, during a time interval T1, since left and right polarities of the fixed magnetic pole 4Y become N and S, respectively, a repulsing force is generated between the fixed and movable magnetic poles 4Y ad 2. During a time interval T2, since the left and right polarities of the fixed magnetic pole 4Y become S and N, respectively, a drive force Y1 (attracting force) is generated between the movable and fixed magnetic poles 2 and 4Y, as represented by c in FIG. 4. Therefore, as shown in FIG. 5(A), the movable magnetic pole 2 is attracted toward the fixed magnetic pole 4Y and moves in the negative Y direction.

During a time interval T3 since the left and right polarities of the fixed magnetic pole 4Y remain as S and N, respectively, an attracting force is present between the movable and fixed magnetic poles 2 and 4Y. However, since the polarity of the fixed magnetic pole 4X becomes N, a drive force Xl (attracting force) is generated between the movable and fixed magnetic poles 2 and 4X, as represented by d in FIG. 4. Therefore, as shown in FIG. 5(B), the movable magnetic pole 2 is attracted toward the fixed magnetic pole 4X and moves in the positive X direction.

During a time interval T4, since the polarity of the fixed magnetic pole 4X remains as N, an attracting force is present between the movable and fixed magnetic poles 2 and 4X. However, since the left and right polarities of the fixed magnetic pole 4Y become N and S, respectively, a drive force Y2 (repulsing force) represented by e in FIG. 4 is generated between the movable and fixed magnetic poles 2 and 4Y. Therefore, as shown in FIG. 5(C), the movable magnetic pole 2 repulses from the fixed magnetic pole 4Y and moves in the positive Y direction.

During a time interval T5, since the left and right polarities of the fixed magnetic pole 4Y remain as N and S, respectively, a repulsing force is present between the movable and fixed magnetic poles 2 and 4Y. However, since the polarity of the fixed magnetic pole 4X becomes S, a drive force X2 (repulsing force) represented by f in FIG. 4 is generated between the movable and fixed magnetic poles 2 and 4X. Therefore, as shown in FIG. 5(D), the movable magnetic pole 2 repulses from the fixed magnetic pole 4X, moves in the negative X direction, and returns to the original position.

During a time interval T6, since the polarity of the fixed magnetic pole 4X remains as S, a repulsing force is present between the movable and fixed magnetic poles 2 and 4X. However, since the left and right polarities of the fixed magnetic pole 4Y become S and N, respectively, the drive force Y1 (attracting force) represented by c in FIG. 4 is generated between the movable and fixed magnetic poles 2 and 4Y. Therefore, as shown in FIG. 5(E), the movable magnetic pole 2 is attracted to the fixed magnetic pole 4Y and moves in the negative Y direction.

Therefore, a moving track of the movable magnetic pole 2 generated by a series of successive operations as described above forms rotary motion. The movable magnetic pole 2 repeats rotary motion as shown in FIGS. 5(E), 5(B), 5(C), and 5(D) as successive time intervals T7, T8, T9, . . . , have passed.

In this case, since rectangular waves are used as the drive currents Ix and Iy, the rotary motion of the movable magnetic pole 2 forms a rectangular motion track. However, if sine waves are used as the drive currents Ix and Iy, the movable magnetic pole 2 circularly moves. In this case, by changing amplitudes of the drive currents Ix and Iy of the sine waves, this circular motion can become elliptic motion, and a ratio between major and minor axes of an ellipse can be arbitrarily changed by amplitude values.

A rotation direction of the movable magnetic pole 2 is counterclockwise in the rotary motion shown in FIG. 5. However, if the drive forces Y1, X1, Y2, and X2 are generated in opposite directions in an order of X2, Y2, X1, and Y1, the movable magnetic pole 2 can be rotated clockwise. That is, by switching directions of the drive currents Ix and Iy by the controller 12, the movable magnetic pole 2 can be rotated in a desired direction.

Since a speed in the rotary motion of the movable magnetic pole 2 is proportional to frequencies of the drive currents Ix and Iy to be supplied to the drive coils 6X and 6Y, respectively, and magnitudes of the drive forces X1, X2, Y1, and Y2 depend on magnitudes (amplitudes) of the drive currents Ix and Iy, a given rotational speed and drive torque can be easily obtained by controlling the frequencies and magnitudes of the drive currents Ix and Iy by the controller 12.

Figure 6:
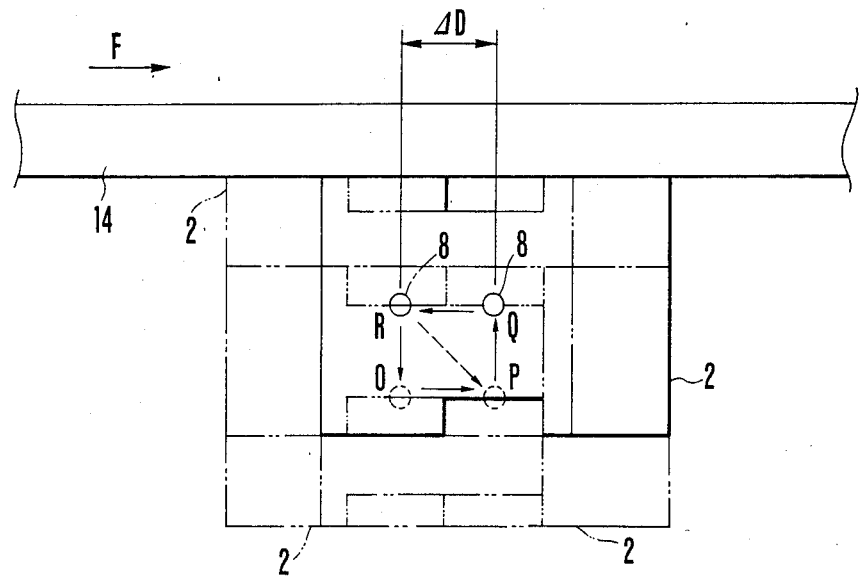
FIG. 6 is a view of movement of a member caused by rotary motion of the motor shown in FIG. 1.

As shown in FIG. 6, when a moving member 14 is so arranged as to correspond to moving interval QR of a moving track OPQR of the movable magnetic pole 2 which performs rotary motion so as to be brought into contact with the movable magnetic pole 2, drive forces at the moving interval QR of the moving track OPQR of the movable magnetic pole 2 can act on the moving member 14. Therefore, in accordance with moving displacement ΔD of the movable magnetic pole 2, the moving member 14 can be moved in a direction indicated by an arrow F for each rotary motion of the movable magnetic pole 2. In this case, a relationship between movement of the moving member 14 and rotary motion of the movable magnetic pole 2 is such that the displacement ΔD is generated by only the drive force X1 shown in FIG. 5(D) in the rotary motion of the movable magnetic pole 2. Therefore, if four motors are arranged and phases of the drive currents Ix and Iy of each motor are shifted $\pi/4$ from each other, the drive force X2 can be generated sequentially in the respective motors, thereby continuously moving the moving member 14.

Figure 7:
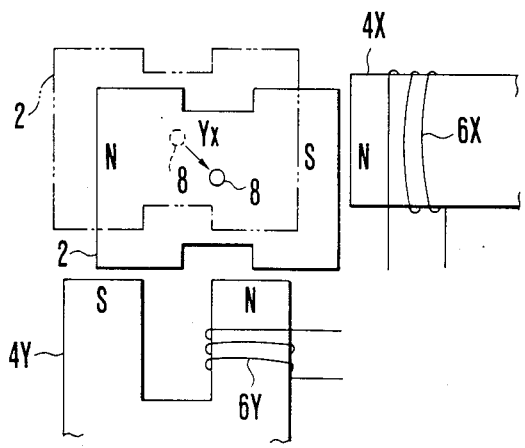
FIG. 7 is a view of a modification of the rotary motion track of the motor shown in FIGS. 5(A) to 5(E)

In addition, as shown in FIG. 7, the movable magnetic pole 2 may be obliquely moved by a drive force Yx from a position indicated by an alternate long and two dashed line to a position {indicated by a solid line in FIG. 5(B)} indicated by a solid line without tracing the moving track shown in FIGS. 5(A) and 5(B). In this case, if the movable magnetic pole 2 is moved from the position R to the position P without passing through the position 0 as represented by an arrow of broken line in FIG. 6, the moving member 14 can be similarly moved.

Figure 8:
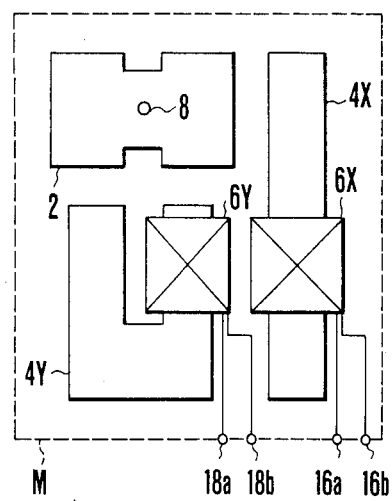
FIG. 8 is a view of an arrangement of a motor unit as an embodiment of the motor of the present invention.
Figure 9:
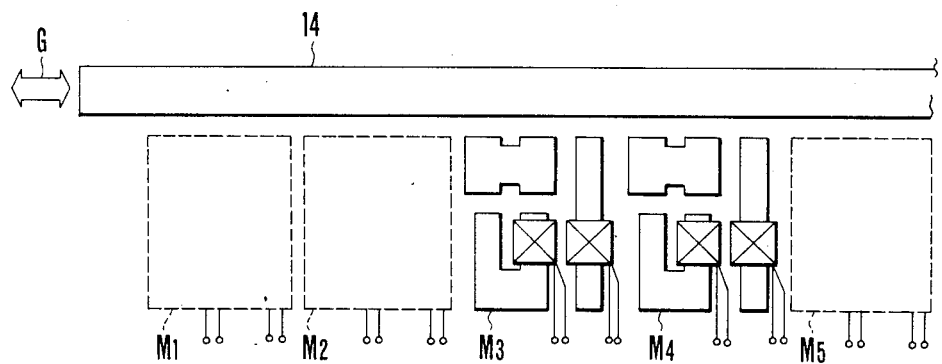
FIG. 9 is a view of a case wherein a plurality of motor units shown in FIG. 8 are used.
Figure 10:
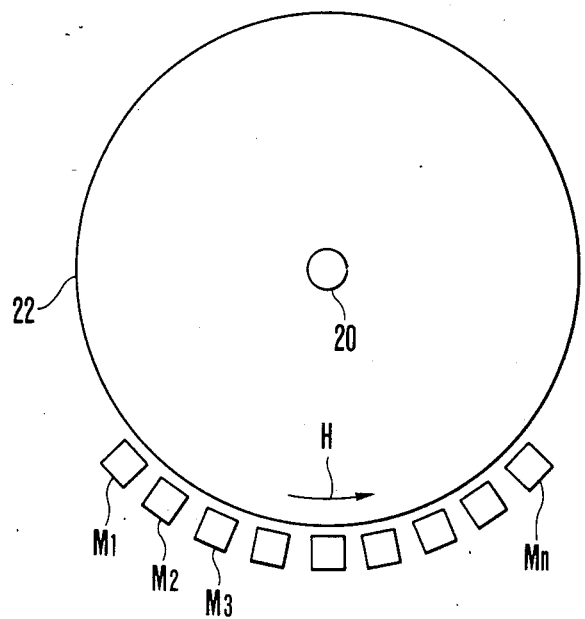
FIG. 10 is a view of a case wherein a rotary member is rotated by a plurality of motor units.

FIGS. 8 to 10 show an embodiment of the motor of the present invention in more detail.

As shown in FIG. 8, an electromagnet motor unit M is constituted by a single movable magnetic pole 2 and fixed magnetic poles 4X and 4Y. In order to supply drive currents to drive coils 6X and 6Y independently of each other, drive input terminals 16a and 16b are formed on the drive coil 6X, and drive input terminals 18a and 18b are formed on the drive coil 6Y, respectively.

As shown in FIG. 9, since a plurality of motor units M1, M2, M3, M4, and M5 are linearly arranged, a moving member 14 is moved in a direction indicated by an arrow G by driving the motor units M1 to M5. When a plurality of motor units M1 to M5 are used in this manner, assuming that a torque generated in the single motor unit M is T and the number of motor units is N, a total torque Tm is given by Tm=T×N. Therefore, a necessary torque Tn can be arbitrarily set by controlling magnitudes of the drive currents for driving the motor units M1 to M5 and by changing the number of motor units N.

As shown in FIG. 10, when a plurality of motor units M1, M2,..., and Mn are arranged on a circumferential surface of a disk-like or columnar rotary member 22 which can be rotated about a shaft 20 and the movable magnetic pole 2 is brought into contact with the circumferential surface of the rotary member 22, the rotary member 22 can be rotated in a direction indicated by an arrow H by the motor units M1, M2,..., and Mn. When the motor units M1, M2, . . . , and Mn are rotated at the same phase, motion displacements thereof become intermittent to increase a torque variation. Therefore, a plurality of motor units M1, M2,..., and Mn may be divided into four groups and the four groups may be driven at four phases, i.e., driven by drive currents whose phases are shifted $\pi/4$ from each other. In this case, a torque ripple can be reduced and smooth rotation can be obtained. When a drive form shown in FIG. 7 is used, motor units may be divided into three groups and the three groups may be driven at three phases.

According to such the motor units M1, M2,..., and Mn, a nonmagnetic material such as aluminum or plastics can be used to form the rotary member 22 while a rotor of a conventional motor is formed of a magnetic material. Therefore, the above motor unit is suitable for eliminating an adverse influence of magnetism. In addition, the number of a plurality of motor units M1, M2,..., and Mn arranged as a source of generating rotary drive force may be one corresponding to the necessary rotation torque. That is, the motor units need not be arranged along the entire circumferential surface of the rotary member 22.

As described above, according to the above embodiment, movement in the X and Y directions can be obtained in accordance with polarities generated in the first and second fixed magnetic poles, and rotary motion corresponding to directions and amplitudes of drive currents flowed through the fixed magnetic poles. Therefore, highly controllable rotary motion whose rotational speed and drive force can be easily, finely, and accurately controlled with an extremely simple arrangement without a mechanical motion converting means. In addition, the rotary motion displacement can be partially and arbitrarily extracted as a linear displacement and used as a drive force in a given direction.

Figure 11:
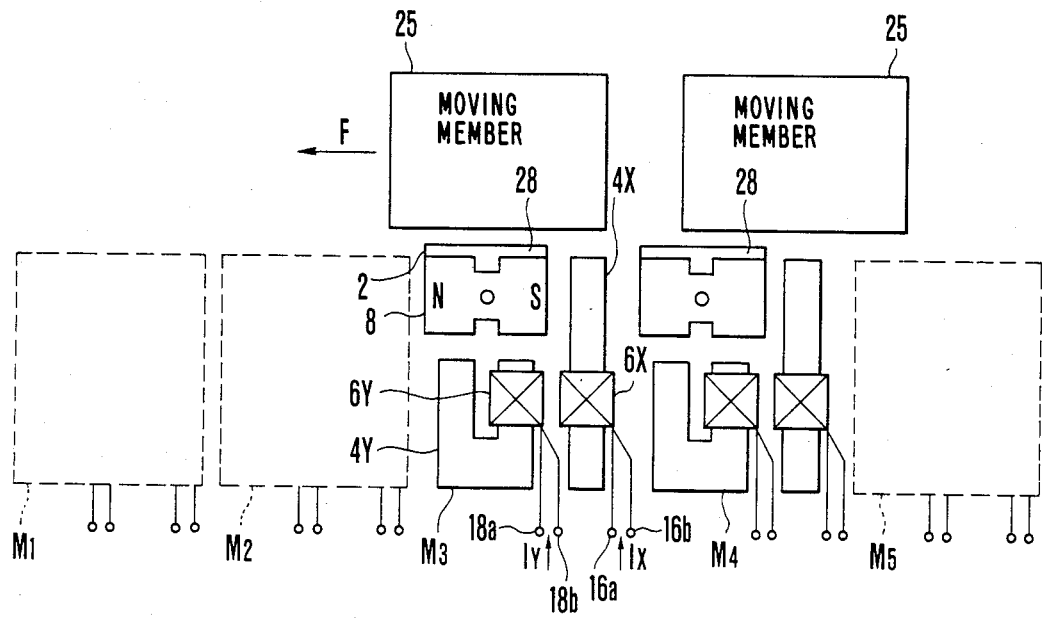
FIG. 11 is a view of another embodiment of the present invention.

FIG. 11 shows another embodiment of the present invention. In FIG. 11, a plurality of drive units are linearly arranged, and fixed magnetic poles are fixed on a base. An object arranged on movable magnetic poles is moved by rotary motion thereof. That is, in this embodiment, the present invention is applied to a conveyor apparatus as a belt conveyor.

In FIG. 11, this conveyor apparatus is obtained by arranging a plurality of drive units M1, M2, M3,..., for conveying an object 25 as an object to be conveyed. When a drive force is successively generated by the drive units M1, M2, M3,..., the object 25 can be conveyed in a direction of arrow F or a direction opposite thereto.

Although only the drive unit M3 is shown in detail in FIG. 11, each of the drive units M1, M2, M3, . . . , has an arrangement similar to that shown in FIG. 8. That is, a first fixed magnetic pole 4X is arranged to apply a magnetic force in the X direction to a movable magnetic pole 2 which can be moved in the X and Y directions, and a second fixed magnetic pole 4Y is arranged to apply a magnetic force in the Y direction thereto.

As shown in FIG. 2, the movable magnetic pole 2, constituted by a permanent magnet having a pair of magnetic poles N and S, is mounted to flexible shaft 8 which allows the movable magnetic pole 2 to move two dimensionally in the X and Y directions. Flexible shaft 8 is such that the movable magnetic poles return to their origin once the drive force is removed from the magnetic poles 4X and 4Y. A friction increasing member to be described later is mounted on a portion of the movable magnetic pole 2 which is brought into contact with the object to be conveyed.

Each of the fixed magnetic poles 4X and 4Y is constituted by a unipolar electromagnet which applies a magnetic force in the X or Y direction to the movable magnetic pole 2. Drive coils 6X and 6Y are wound around the electromagnets of the fixed magnetic poles 4X and 4Y, respectively, and polarities thereof are controlled by changing the direction of drive currents Ix and Iy which flow through drive coils 6X and 6Y to drive input terminals 16a and 16b, and 18a and 18b thereof, respectively.

In this case, the drive currents Ix and Iy are respectively flowed from drivers 10X and 10Y to the drive input terminals 16a and 16b, and 18a and 18b of the drive coils 6X and 6Y as shown in FIG. 3, and the controller 12 controls directions of the drive currents and a phase relationship therebetween as shown in FIG. 4. Magnitudes of the drive currents Ix and Iy may be arbitrarily and adjustably set by a variable resistor 12a or the like.

If the object 25 is brought into contact with an upper surface of the movable magnetic pole 2 of each of the drive units M1, M2, M3,..., during intervals shown in FIGS. 5(C) and 5(D) by rotating the movable magnetic pole 2, it is subjected to the drive force X2 of rotary motion of the movable magnetic pole 2 and moves in accordance with a motion displacement $\Delta D$ during intervals of a moving track of the movable magnetic pole 2. The motion displacement $\Delta D$ is caused by one rotary motion of each of the drive units M1, M2, M3, . . . , so that the object 25 is moved along the linearly arranged drive units M1, M2, M3, . . . , and conveyed.

FIG. 12 shows a modification of the movable magnetic pole 2 used in the present invention. In this modification, a friction increasing leg portion 28 formed of, e.g., rubber is provided on a lower surface of the movable magnetic pole 2 to cause friction between the lower surface and a moving surface.

An arrangement which employs the movable magnetic pole of FIG. 12 is shown in FIG. 13.

FIG. 13 shows an embodiment of a moving body of the present invention.

This moving body is obtained by arranging a plurality of motor units M1, M2,..., and Mn on a fixing frame 26 as a fixing member at predetermined intervals. In each of the motor units M1, M2,..., and Mn, a first fixed magnetic pole 4X is so arranged as to apply a magnetic force in an X direction to a movable magnetic pole 2 which can be moved in X and Y directions, and a second fixed magnetic pole 4Y is so arranged as to apply a magnetic force in a Y direction thereto.

As shown in FIG. 12, the movable magnetic pole 2, constituted by a permanent magnet having a pair of magnetic poles N and S, is mounted to flexible shaft 8 which allows the movable magnetic pole 2 to move two-dimensionally in the X and Y directions. Flexible shaft 8 is such that the movable magnetic poles return to their origin once the drive force is removed from the fixed magnetic poles 4X and 4Y. A leg portion 28 formed of, e.g., rubber is mounted on a lower surface of the movable magnetic pole 2 to cause friction between the lower surface and a moving surface.

Each of the fixed magnetic poles 4X and 4Y is constituted by a unipolar electromagnet similar to that shown in FIG. 8. The fixed magnetic poles 4X and 4Y are magnetized by supplying drive currents Ix and Iy to terminals 16a and 16b, and 18a and 18b of drive coils 6X and 6Y wound around the electromagnets, respectively, and polarities of surfaces facing the movable magnetic pole 2 can be controlled by changing the directions the drive currents Ix and Iy, respectively.

Therefore, by changing polarities of the fixed magnetic poles 4X and 4Y with respect to the movable magnetic pole 2, an attracting force or a repulsing force is generated between the movable magnetic pole 2 and the fixed magnetic pole 4X or 4Y, thereby moving the movable magnetic pole 2 in the X or Y direction to generate rotary motion thereof. For this reason, the fixing frame 26 and the motor units M1 to Mn can be moved in one direction. In this case, a driver of the fixed magnetic pole is similar to that shown in FIG. 3.

Figure 14:
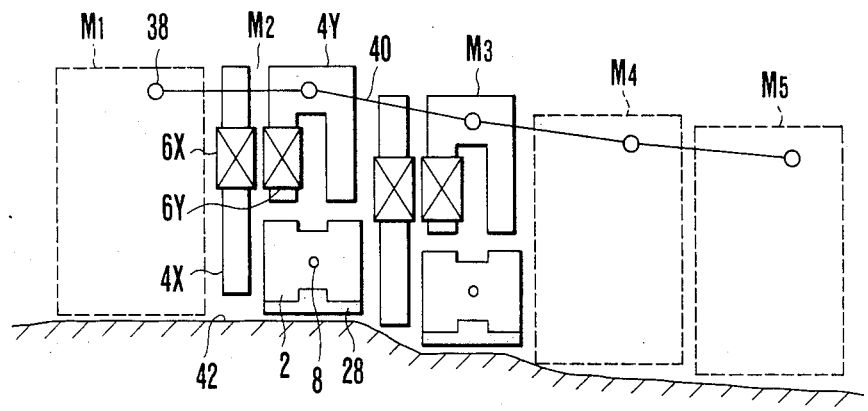
FIG. 14 is a view of still another embodiment of the present invention.

FIG. 14 shows an arrangement in which a moving body is obtained by coupling a plurality of motor units M1, M2, M3,..., so as to be vertically moved with a support shaft 38 and a coupling member 40. With this arrangement, the moving body can be moved along a moving surface 42 with projections or inclination.

Figure 15:
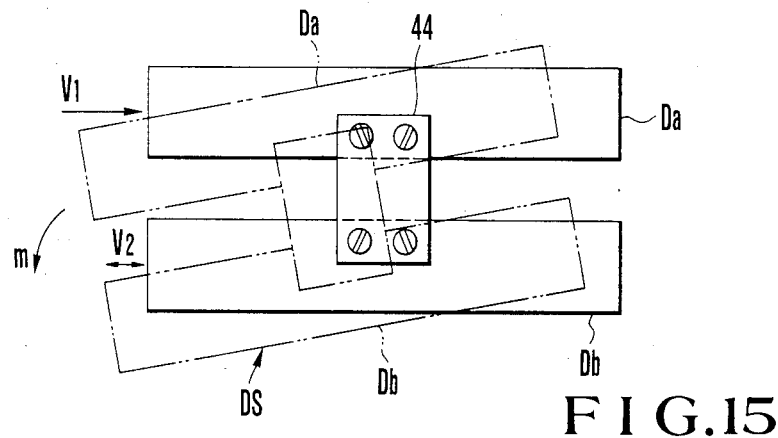
FIG. 15 is a view of rotation of a moving apparatus obtained by coupling moving bodies shown in FIG. 13.

When two sets of moving bodies Da and Db each obtained by coupling a plurality of motor units M1, M2, ..., and Mn shown in FIG. 9 are coupled parallel to each other at a predetermined interval by a joint member 44 to constitute a single moving apparatus DS as shown in FIG. 15, a moving direction of the moving apparatus DS can be changed by adjusting deplacing speeds V1 and V2 of the moving bodies Da and Db. For example, assuming that a speed of the moving body Da is V1 and that of the moving body Db is V2 (<V1), the moving apparatus DS can be rotated in a direction indicated by an arrow m. In this case, by changing directions of the drive currents Ix and Iy, the moving apparatus DS can be rotated on the spot or moved backward.

Figure 16:
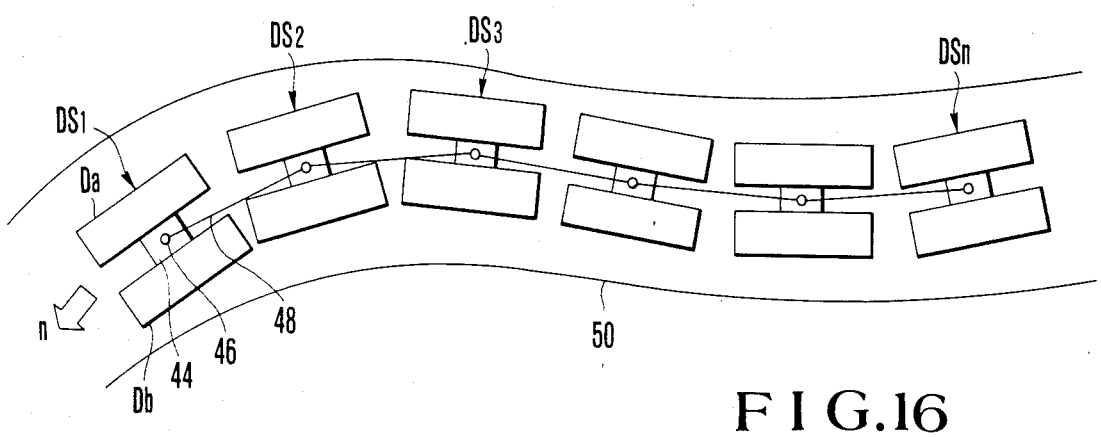
FIG. 16 is a view of a moving system obtained by coupling a plurality of moving apparatuses.

FIG. 16 shows a successive moving system obtained by coupling moving apparatuses DS1, DS2, . . . , and DSn each consisting of two sets of moving bodies Da and Db by a joint member 48 mounted on a support shaft 46 provided to the joint member 44 for coupling the moving bodies Da and Db so as to move in a transverse direction. According to this moving system, by adjusting displacing speeds of the moving bodies Da and Db of each of the moving apparatuses DS1, DS2, . . ., and DSn, the moving apparatuses DS1, DS2, . . . , and DSn can be moved along a curved moving path 40 in a direction indicated by an arrow n in a zig-zag manner.

Figure 17:
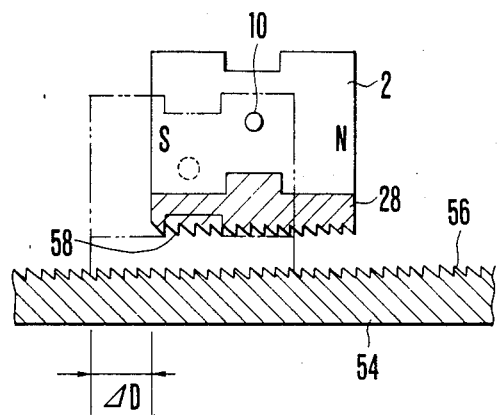
FIGS. 17 and 18 are views of arrangements of a leg portion and a moving path of the movable magnetic pole, respectively.

Note that as shown in FIG. 17, when a saw-toothed uneven surface 56 is formed on a surface of a moving path 54 on which the leg portion 28 provided to the movable magnetic pole 2 is moved and an uneven surface 58 which meshes with the uneven surface 56 is formed on the leg portion 28 or a lower surface of the movable magnetic pole 2, the movable magnetic pole 2 can be reliably stopped on the moving path 44 for each moving displacement $\Delta D$.

Figure 18:
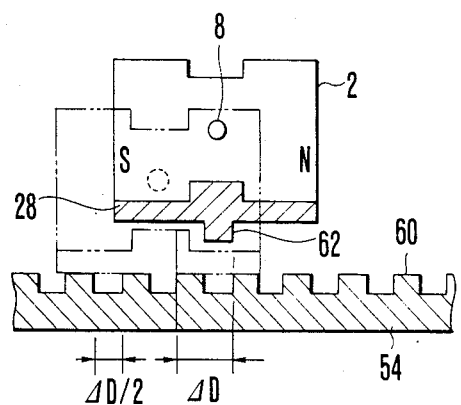

Moreover, as shown in FIG. 18, when an uneven surface 60 consisting of recesses and projections each having a width of, e.g., $\Delta D/2$ is formed on the surface of the moving path 54 in correspondence to the moving displacement $\Delta D$ of the movable magnetic pole 2 and a projecting surface 62 which meshes with the uneven surface 60 is formed on the leg portion 28, the movable magnetic pole 2 can be reliably stopped on the moving path 54 for each moving displacement $\Delta D$. Therefore, sliding of the movable magnetic pole 2 can be prevented and an accurate moving pitch can be obtained.

In each of the above embodiments, a permanent magnet is used as a movable magnetic pole. In this case, if a ferromagnetic material such as iron is used as a moving path, the movable magnetic pole is attracted to the moving path even when a moving displacement is generated because a polarity of the permanent magnet is fixed. As a result, a drive force may be degraded to prevent movement. For this reason, an electromagnet may be used as the movable magnetic pole and a given polarity may be magnetized to the movable magnetic pole at a proper timing for only a proper time interval. In this case, even if the ferromagnetic material such as iron is used as the moving path, a polarity opposite to that magnetized to the moving path can be generated to the movable magnetic pole when the movable magnetic pole starts to move from a holding state. Therefore, the movable magnetic pole can be spontaneously repulsed from the moving path to generate rapid movement, thereby eliminating a problem posed when the permanent magnet is used as the movable magnetic pole.

FIG. 19 shows an embodiment of a moving body of the present invention.

This moving body is obtained by arranging a plurality of motor units M1, M2,..., and Mn at predetermined intervals and fixing them on a fixing frame 102 as a fixing member. Each of the motor units M1, M2, . . . , and Mn comprises a first fixed magnetic pole 106X for applying a magnetic force in an X direction to a movable magnetic pole 104 which can be moved in the X and Y directions and a second fixed magnetic pole 106Y for applying a magnetic force in the Y direction thereto. The movable magnetic pole 104 is arranged at a position where it can be attracted by a moving path 108 formed of a ferromagnetic material such as iron.

The movable magnetic pole 104 is obtained by winding drive coils 112 around an iron core at left and right sides thereof so as to sandwich a shaft 110 which is the support center of the iron core. By the shaft 110, as shown in FIG. 20, the movable magnetic pole 104 can be moved in the X and Y directions using an elastic support member 114 which is moved toward the moving path 108 by a biasing force F generated by magnetizing the movable magnetic pole 104 and has an elastic force for returning the movable magnetic pole 104 to an original position when the biasing force F is released. Left and right polarities of magnetic poles N and S can be arbitrarily set by a direction of a drive current Im flowing between terminals 116a and 116b of the drive coils 112. Lead wires for connecting the terminals 116a and 116b of the drive coils 112 are arranged along, e.g., the shaft 110.

Contrary to the movable magnetic pole 104, the fixed magnetic pole 106X is constituted by a unipolar electromagnet. By supplying a drive current Ix to terminals 120a and 120b of a drive coil 118X wound around a rod-like iron core, the fixed magnetic pole 106X is magnetized, and a polarity of a surface, facing the movable magnetic pole 104 can be controlled by changing the a direction of the drive current Ix.

The fixed magnetic pole 106Y consists of an electromagnet having an iron core whose surface facing the movable magnetic pole 104 is dipolar . Left, and right polarities are controlled by changing the a direction of a drive current Iy which flows through terminals 122a and 122b of a drive coil 118Y wound around one of magnetic poles.

Therefore, by changing the polarities of the fixed magnetic poles 106X and 106Y with respect to the movable magnetic pole 104, an attracting force or a repulsing force is generated between the movable and fixed magnetic poles 104 and 106X and between the movable and fixed magnetic poles 104 and 106Y, respectively. As a result, the movable magnetic pole 104 can be moved in the X and Y directions to generate rotary motion.

In this case, as shown in FIG. 21, drivers 124X, 124Y, and 126 are so arranged as to supply drive currents Im, Ix, and Iy to the drive coils 112, 118X, and 118Y, respectively, and a controller 128 controls the drive currents Im, Ix, and Iy flowing respectively to the drive coils 112, 118X, and 118Y. In this case, if the controller 128 varies magnitudes of the drive currents Ix, Iy, and Im using, e.g., a variable resistor 128a provided externally as a speed setting means, a magnetic force can be adjusted and an attracting or repulsing force can be set to have a given magnitude.

Figure 22:
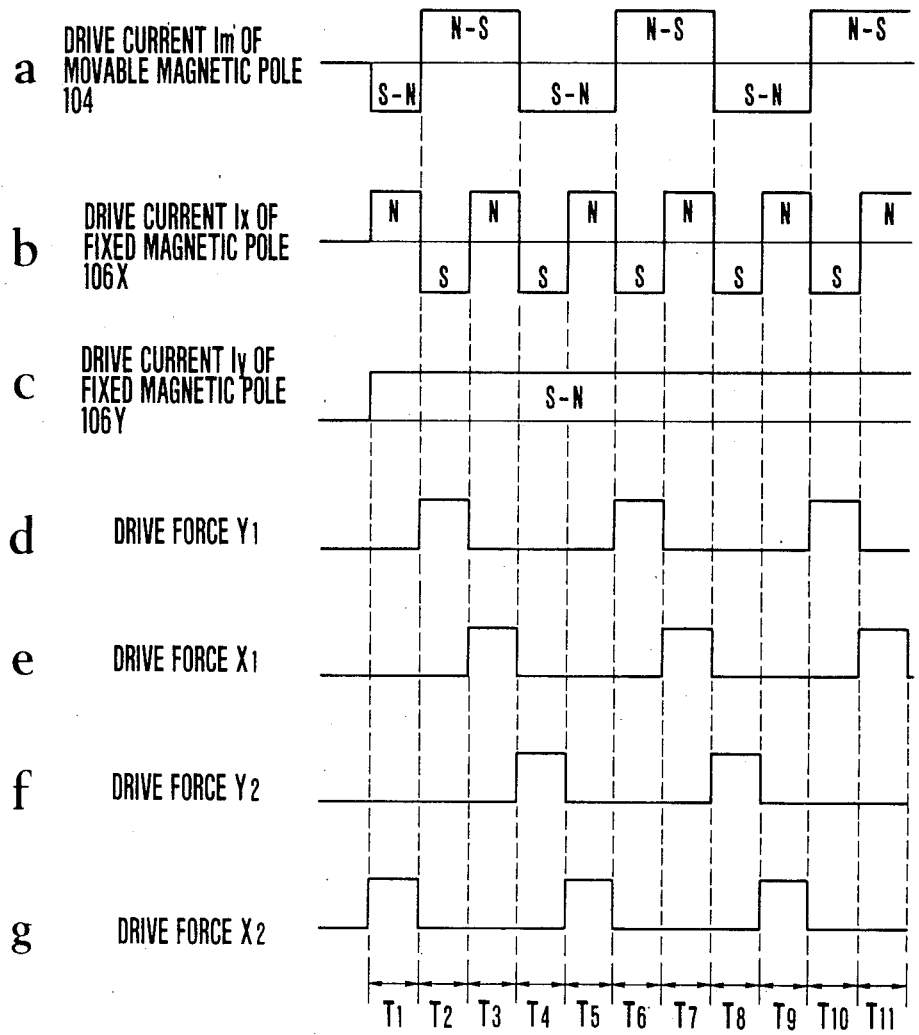
FIG. 22 is a timing chart of drive currents and drive forces of the motor unit.

When the drive currents Im and Ix whose rectangular waves are synchronized with each other flow to the drive coils 112 and 118X, respectively, as represented by a and b of FIG. 22, magnetic poles N and S represented by a in FIG. 22 are alternated on a magnetic pole surface of the movable magnetic pole 104 by the drive current Im at a predetermined period, and magnetic poles N and S represented by b in FIG. 22 are alternated on a magnetic pole surface facing the movable magnetic pole 104 of the fixed magnetic pole 106X by the drive current Ix at a predetermined period. When the drive current Iy is flowed to the drive coil 118Y at the same time, left and right fixed polarities are generated as S and N, respectively, in the fixed magnetic pole 6Y as represented by c in FIG. 22.

Figures 23A, 23B:
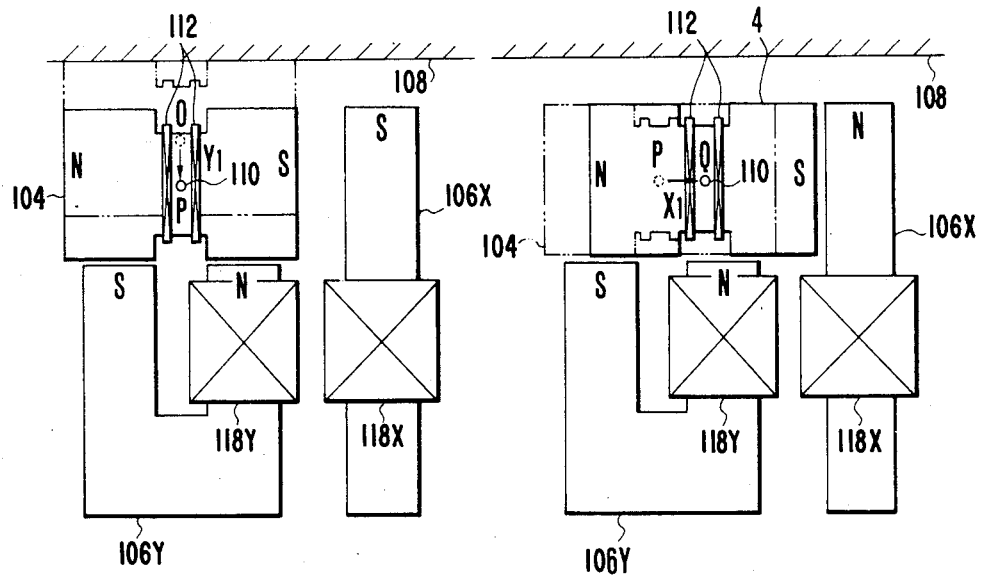
FIGS. 23(A) to 23(D) are views of a rotary motion track of a movable magnetic pole of the motor unit.

During a time interval T1, since left and right polarities of the movable magnetic pole 104 become S and N, respectively, repulsing forces are generated between the fixed and movable magnetic poles 106X and 104 and between the fixed and movable magnetic poles 106Y and 104. During a time interval T2, the left and right polarities of the movable magnetic pole 104 become N and S, respectively, and the polarity of the fixed magnetic pole 106Y becomes S in correspondence thereto. Therefore, a repulsing force is present between the movable and fixed magnetic poles 104 and 106X, and a drive force Y1 (attracting force) is generated between the movable and fixed magnetic poles 104 and 106Y as represented by d in FIG. 22. For this reason, as shown in FIG. 23(A), the movable magnetic pole 104 is attracted toward the fixed magnetic pole 106Y and moves in a negative Y direction.

During a time interval T3, since the left and right polarities of the movable magnetic pole 104 remain as N and S, respectively, an attracting force is present between the movable and fixed magnetic poles 104 and 106Y. However, as shown in FIG. 23(B), since the polarity of the fixed magnetic pole 106X becomes N, a drive force X1 (attracting force) is generated between the movable and fixed magnetic poles 104 and 106X, as represented by e in FIG. 22. Therefore, the movable magnetic pole 104 is attracted toward the fixed magnetic pole 106X and moves in a positive X direction.

Figures 23C, 23D:
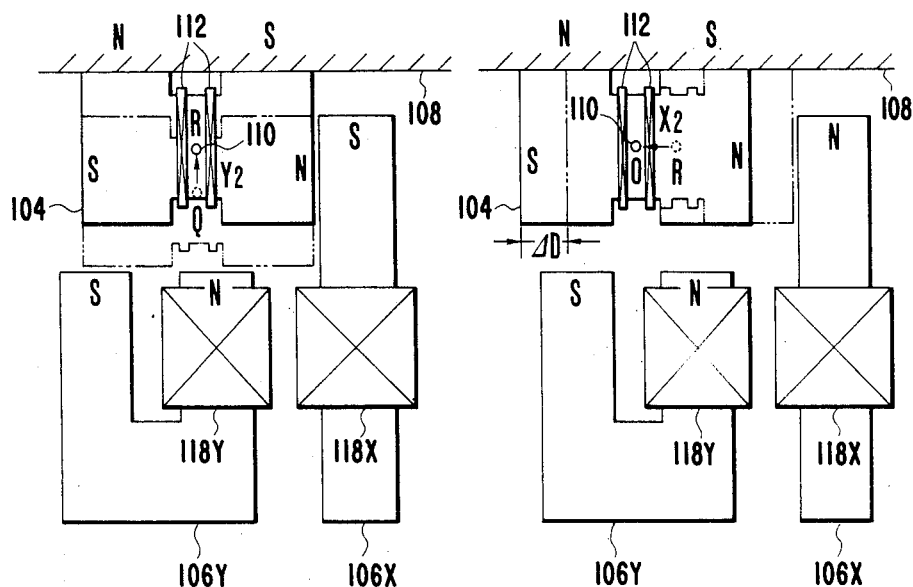

During a time interval T4, as shown in FIG. 23(C), the left and right polarities of the movable magnetic pole 104 become S and N, respectively, and the polarity of the fixed magnetic pole 106X becomes S in correspondence thereto. Therefore, an attracting force is present between the movable and fixed magnetic poles 104 and 106X, and a drive force Y2 (repulsing force) represented by f in FIG. 22 is generated between the movable and fixed magnetic poles 104 and 106Y. For this reason, the movable magnetic pole 104 repulses from the fixed magnetic pole 106Y and moves in a positive Y direction. At this time, since polarities of N and S are formed on a surface of the moving path 108 in correspondence to polarities S and N of the movable magnetic pole 104, the movable magnetic pole 104 is attracted to the moving path 108.

During a time interval T5, since the left and right polarities of the movable magnetic pole 104 remain as S and N, respectively, a repulsing force is present between the movable and fixed polarities 104 and 106Y. However, as shown in FIG. 23(D), since the polarity of the fixed magnetic pole 106X becomes N, a drive force X2 (repulsing force) represented by g in FIG. 22 is generated between the movable and fixed magnetic poles 104 and 106X. Therefore, the movable magnetic pole 104 repulses from the fixed magnetic pole 106X, moves in the negative X direction, and returns to the original position. As a result, moving displacement $\Delta D$ in the positive X direction is generated in the moving body.

During a time interval T6, as shown in FIG. 23(A), the left and right polarities of the movable magnetic pole 104 become N and S, respectively, and the polarity of the fixed magnetic pole 106X becomes S in correspondence thereto. Therefore, a repulsing force is present between the movable and fixed magnetic poles 104 and 106X, and a drive force Y1 (attracting force) represented by d in FIG. 22 is generated between the movable and fixed magnetic poles 104 and 106Y. As a result, the movable magnetic pole 104 is attracted to the fixed magnetic pole 106Y and moves in the negative Y direction.

Therefore, as is apparent from a moving track OPQR of the shaft 110 shown in FIG. 24, a moving track of the movable magnetic pole 104 generated by such a series of successive operations forms rectangular rotary motion. The movable magnetic pole 104 repeats the rotary motion as shown in FIGS. 23(A), 23(B), 23(C), and 23(D) as successive time intervals T7, T8, T9, . . . , have passed. Therefore, if the movable magnetic pole 104 of each of the motor units M1, M2,..., and Mn is brought into contact with the surface of the moving track 108 during an interval RO, the moving body shown in FIG. 19 is moved by the drive force X2 in the rotary motion of the movable magnetic pole 104 in a direction opposite to that of the drive force X2.

In this case, since rectangular waves are used as the drive currents Im and Ix, the rotary motion of the movable magnetic pole 104 forms a rectangular motion track. However, if sine waves are used as the drive currents Im and Ix, the movable magnetic pole 104 circularly moves. In this case, by changing amplitudes of the drive currents Im and Ix of the sine waves, this circular motion can be changed to an elliptic motion, and a ratio of major and minor axes of an ellipse can be arbitrarily changed by amplitude values.

A rotating direction of rotary motion of the movable magnetic pole 104 is counterclockwise in FIGS. 23(A) to 23(D). However, when the drive forces Y1, X1, Y2, and X2 are generated in opposite directions in an order of X2, Y2, Xl, and Y1, the movable magnetic pole 104 can be rotated clockwise. Therefore, by switching a direction of the drive current Im, Ix, or Iy by the controller 128, the movable magnetic pole 104 can be rotated in a desired direction to move the moving body in a desired direction.

A speed of rotary motion of the movable magnetic pole 104 is proportional to frequencies of the drive currents Im, Ix, and Iy respectively supplied to the drive coils 112, 118X, and 118Y, and magnitudes of the drive forces X1, X2, Y1, and Y2 depend on magnitudes (amplitudes) of the drive currents Im, Ix, and Iy. Therefore, the controller 128 controls magnitudes of the drive currents Im, Ix, and Iy using a current varying means such as a variable resistor to set a given drive torque and controls the frequencies of the drive currents Im, Ix, and Iy to adjust the speed of the moving body.

In this case, a relationship between movement of the moving body and rotary motion of the movable magnetic pole 104 is taken into consideration. The displacement $\Delta D$ is generated by only the drive force X2 shown in FIG. 23(D) in rotary motion of the movable pole 104. Therefore, if four motors are specifically arranged and phases of the drive currents Im and Ix of each motor are shifted $\pi/4$ from each other, the drive force X2 can be sequentially generated in the motor units M1, M2,..., and Mn. As a result, movement of the moving body can be changed from intermittent to continuous movement.

When the movable magnetic pole 104 is attracted to the moving path 108 as shown in FIG. 23(D), polarities of N and S are formed on the surface of the moving path 108 in correspondence to polarities S and N of the movable magnetic pole 104 as shown in FIG. 25(A). Therefore, the movable magnetic pole 104 is tightly attracted to the moving path 108. This state may prevent movement of the movable magnetic pole 104. For this reason, as shown in FIG. 25(B), the drive current Im with respect to the drive coil 112 flows in an opposite direction to invert the polarities S and N to N and S since the movable magnetic pole 104 is advantageously constituted by an electromagnet. As a result, a repulsing force is generated between the magnetized polarities N and S of the moving path 108, so that the movable magnetic pole 104 can rapidly start moving.

Figure 26:
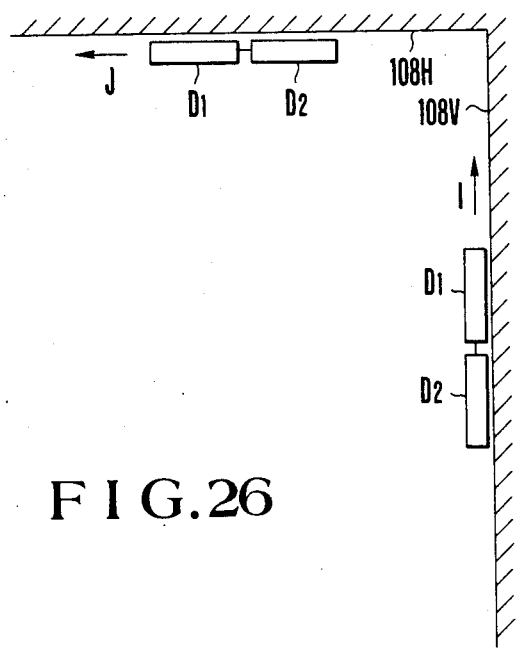
FIGS. 26 and 27 are views of a moving form of the moving body of the present invention.
Figure 27:
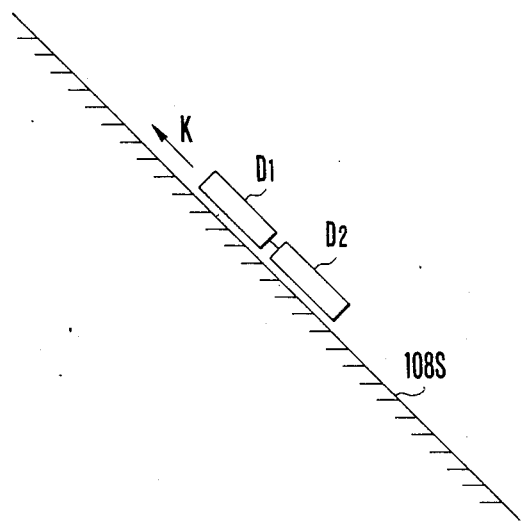

In addition, as shown in FIG. 26 or 27, when a plurality of moving bodies D1 and D2 are coupled with each other and moved along a moving surface such as a vertical wall surface 108V, a ceiling surface 108H, or an inclined surface 108S each formed of a ferromagnetic material such as iron, the coupled moving bodies D1 and D2 can be arbitrarily moved along the moving surface in directions indicated by arrows I, J, and K or in directions opposite thereto while being kept attracted onto the moving surface.

Note that in the above embodiment, the fixed magnetic poles 106X and 106Y are constituted by electromagnets. However, one of the fixed magnetic poles 106X and 106Y may be constituted by a permanent magnet.

As described above, according to the embodiment shown in FIGS. 19 to 27, movement in the X and Y directions can be obtained in accordance with polarities generated in the movable magnetic pole and the first and second fixed magnetic poles. Therefore, the linear displacement can be extracted from rotary motion obtained by the motor units in accordance with directions and amplitudes of drive currents flowed to the movable and fixed magnetic poles and can be used as a drive force in a given direction. As a result, linear motion in the X and Y directions can be obtained without a motion converting means consisting of a rotary body such as a wheel or a gear, so that the moving body can be moved on a horizontal, vertical, or inclined moving path formed of a ferromagnetic material.

FIGS. 28(A) and 28(B) show still another embodiment of the present invention. In FIGS. 28(A) and 28(B), a motor M comprises a first fixed magnetic pole 4X for applying a magnetic force in the X direction to a movable magnetic pole 208 which can be moved in the X and Y directions and a second fixed magnetic pole 4Y for applying a magnetic force in the Y direction thereto. Drive units D1, D2, ..., each consisting of a single motor M or a plurality of motors M1, M2,..., and Mn are coupled through flexible joint members (cylinder joints 202A and 202B). Therefore, by rotary motion of the movable magnetic pole 28 of the motor M or each of the motors M1, M2,..., and Mn, the drive units D1, D2, ..., can be moved along a surface such as a horizontal, vertical, curved, or uneven surface of a moving path 226 while changing its form.

More specifically, as shown in FIG. 28(A), this moving body is obtained by coupling a plurality of drive units D1, D2, ..., through a pair of cylinder joints 202A and 202B as flexible joint members connected to upper and lower portions of each drive unit. The cylinder joints 202A and 202B are joint arms which extend/contract in accordance with drive signals Va and Vb, respectively, and are pivotally mounted at front and rear ends of each of the drive units D1, D2, ..., by support shafts 204.

As shown in FIG. 28(B), each of the drive units D1, D2, ..., is obtained by arranging a plurality of motors M1, M2, ..., and Mn at predetermined intervals and fixing them on a fixing frame 206 as a fixing member. The cylinder joints 202A and 202B are mounted at a front portion of the fixing frame 206 and at a rear portion thereof, respectively. In each of the motors M1, M2, ..., and Mn, the first fixed magnetic pole 4X is arranged to apply a magnetic force in the X direction to the movable magnetic pole 2 which can be moved in the X and Y directions and the second fixed magnetic pole 4Y is arranged to apply a magnetic force in the Y direction thereto. Note that each of the drive units D1, D2, ..., may be constituted by a single motor M.

As shown in FIG. 12, the movable magnetic pole 2, constituted by a permanent magnet having a pair of magnetic poles N and S, is mounted to flexible shaft 8 which allows the movable magnetic pole 2 to move two-dimensionally in the X and Y directions. Flexible shaft 8 is such that the movable magnetic poles return to their origin once the drive force is removed from the fixed magnetic poles 4X and 4Y. A leg portion 28 formed of, e.g., rubber is mounted on a lower surface of the movable magnetic pole 2 to cause friction between the lower surface and a moving path surface. When the moving path is formed of a ferromagnetic material, a magnetic pole surface of the movable magnetic pole 2 is exposed so that the movable magnetic pole 2 is attracted to the moving path.

The fixed magnetic pole 4X is constituted by a unipolar electromagnet and is magnetized by supplying a drive current Ix to a drive coil 6X wound around the electromagnet. The direction of the polarity of a surface facing the movable magnetic pole 2 can be controlled by changing the a direction of the drive current Ix.

The fixed magnetic pole 4Y is constituted by an electromagnet having an iron core whose surface facing the movable magnetic pole 2 is dipolar,. Left and right polarities can be controlled by changing the directions a drive current Iy to be flowed through a drive coil 6Y wound around one of magnetic poles.

Therefore, by changing polarities of the fixed magnetic poles 4X and 4Y with respect to the movable magnetic pole 2, an attracting force or a repulsing force is generated between the movable and fixed magnetic poles 2 and 4X and between the movable and fixed magnetic poles 2 and 4Y. As a result, the movable magnetic pole 2 can be moved in the X and Y directions to generate rotary motion.

Figure 29:
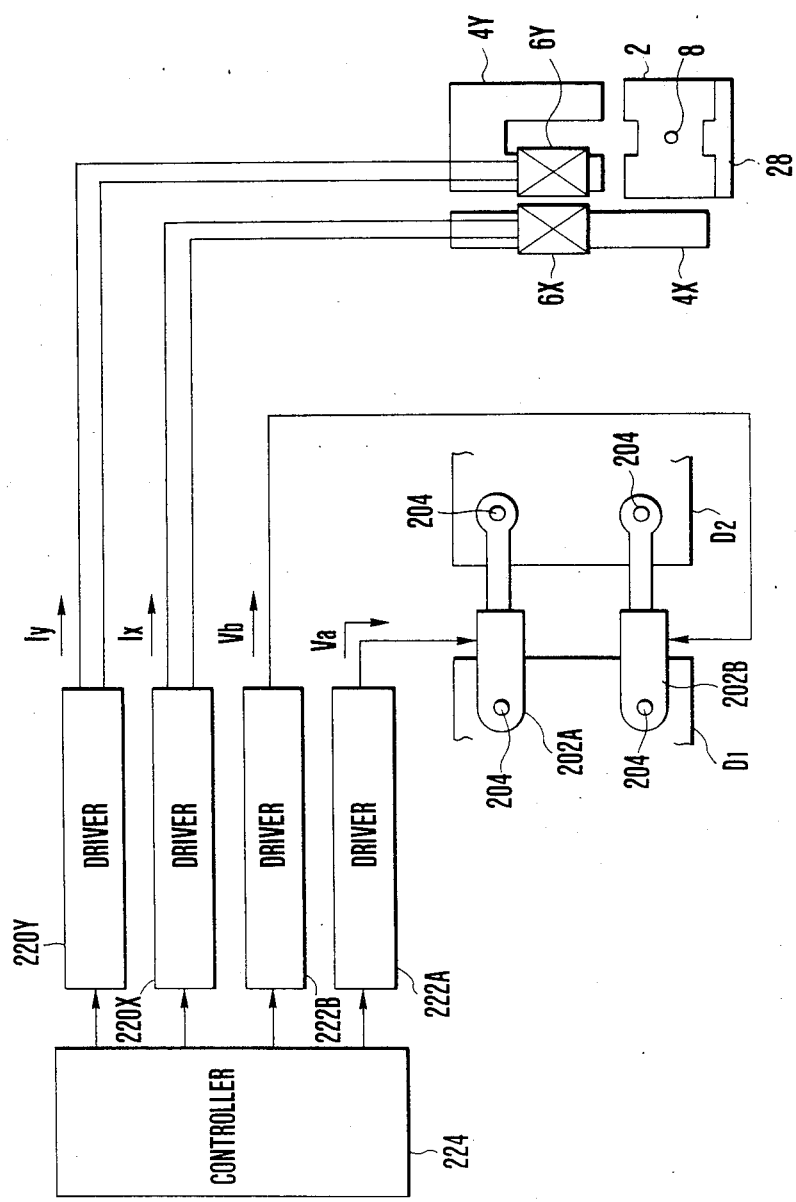
FIG. 29 is a block diagram of a drive control apparatus of a motor and a cylinder coupler.

Therefore, as shown in FIG. 29, a driver 220X supplies the drive current Ix to drive coil 6X, and a driver 220Y is arranged to supply the drive current Iy to drive coil 6Y. In addition, drivers 222A and 222B are arranged to supply drive signals Va and Vb to the cylinder joints 202A and 202B, respectively. A controller 224 controls generation timings, generation time intervals, magnitudes, frequencies, and the like of the drive currents Ix and Iy and the drive signals Va and Vb from the drivers 220X, 220Y, 222A, and 222B. In this case, a variable resistor may be externally provided as a speed setting means, and the variable resistor may be adjusted to cause the controller 224 to vary the magnitudes of the drive currents Ix and Iy and the drive signals Va and Vb.

As shown by a and b in FIG. 4, the drive currents Ix and Iy of rectangular waves whose phases $\phi$ are shifted $\pi/2$ from each other flow from the drivers 220X and 220Y to the drive coils 6X and 6Y. As a result, magnetic poles N and S represented by a in FIG. 4 are alternated on the magnetic pole surface of the fixed magnetic pole 4X by the drive current Ix at a predetermined period, and magnetic poles N and S represented by b in FIG. 4 are alternated on the magnetic pole surface of the fixed magnetic pole 4Y by the drive current Iy at a predetermined period.

During a time interval T1, since the left and right polarities of the fixed magnetic pole 4Y become S and N, respectively, a repulsing force is generated between the fixed and movable magnetic poles 4Y and 2. During a time interval T2, as shown in FIG. 30(A), since the left and right polarities of the fixed magnetic pole 4Y become N and S, respectively, a drive force Y1 (attracting force) is generated as represented by c in FIG. 4 between the movable and fixed magnetic poles 2 and 4Y. Therefore, the movable magnetic pole 2 is attracted toward the fixed magnetic pole 4Y and moves in a positive Y direction.

During a time interval T3, the left and right polarities of the fixed magnetic pole 4Y remain as N and S, respectively, an attracting force is present between the movable and fixed magnetic poles 2 and 4Y. However, as shown in FIG. 30(B), since the polarity of the fixed magnetic pole 4X becomes N, a drive force X1 (attracting force) is generated as represented by d in FIG. 4 between the movable and fixed magnetic poles 2 and 4X. Therefore, the movable magnetic pole 2 is attracted toward the fixed magnetic pole 4X and moves in a negative X direction.

During a time interval T4, since the polarity of the fixed magnetic pole 4X remains as N, an attracting force is present between the movable and fixed magnetic poles 2 and 4X. However, as shown in FIG. 30(C), since the left and right polarities of the fixed magnetic pole 4Y become S and N, respectively, a drive force Y2 (repulsing force) represented by e in FIG. 4 is generated between the movable and fixed magnetic poles 2 and 4Y. Therefore, the movable magnetic pole 2 repulses from the fixed magnetic pole 4Y and moves in a negative Y direction.

During a time interval T5, since the left and right polarities of the fixed magnetic pole 4Y remain as S and N, respectively, a repulsing force is present between the movable and fixed magnetic poles 2 and 4Y. However, as shown in FIG. 30(D), since the polarity of the fixed magnetic pole 4X becomes S, a drive force X2 (repulsing force) represented by f in FIG. 4 is generated between the movable and fixed magnetic poles 2 and 4X. Therefore, the movable magnetic pole 2 repulses from the fixed magnetic pole 4X, moves in the positive X direction, and returns to an original position.

During a time interval T6, since the polarity of the fixed magnetic pole 4X remains as S, a repulsing force is present between the movable and fixed magnetic poles 2 and 4X. However, as shown in FIG. 30(A), since the left and right polarities of the fixed magnetic pole 4Y become N and S, respectively, the drive force Y1 (attracting force) represented by c in FIG. 4 is generated between the movable and fixed magnetic poles 2 and 4Y. Therefore, the movable magnetic pole 2 is attracted toward the fixed magnetic pole 4Y and moves in the positive Y direction.

Therefore, as is apparent from a moving track OPQR of the flexible shaft 8 shown in FIG. 31, a moving track of the movable magnetic pole 2 generated by such a series of successive operations forms a rectangular rotary motion. The movable magnetic pole 2 repeats rotary motion as shown in FIGS. 30(A), 30(B), 30(C), and 30(D) as successive time intervals T7, T8, T9, . . . , have passed. Therefore, if the lower surface of the leg portion 28 of the movable magnetic pole 2 is brought into contact with the moving path surface during an interval RO, the drive units D1, D2, . . . , of the moving body shown in FIGS. 28(A) and 28(B) can be moved by the drive force X2 in the rotary motion of the movable magnetic pole 2 in a direction opposite to that of the drive force X2.

In this case, since rectangular waves are used as the drive currents Ix and Iy, the rotary motion of the movable magnetic pole 2 forms a rectangular motion track. However, if sine waves are used as the drive currents Ix and Iy, the movable magnetic pole 2 circularly moves. In this case, by changing amplitudes of the drive currents Ix and Iy of sine waves, this circular motion can be changed to an elliptic motion, and a ratio between major and minor axes of an ellipse can be arbitrarily changed by amplitude values.

According to the drive units D1, D2, . . . , in which the motors M1, M2,..., and Mn are arranged to rotate as described above, by adjusting magnitudes of the drive signals Va and Vb from the drivers 222A and 222B in accordance with movement thereof, the cylinder joints 202A and 202B can extend/contract. For example, as shown in FIG. 32, when the cylinder joint 202A contracts and the cylinder joint 202B extends by adjusting the magnitudes of the drive signals Va and Vb, the driver unit D1 is bent in a direction indicated by an arrow U. When the cylinder joint 202B contracts and the cylinder joint 202A extends, the drive unit D1 is bent in a direction indicated by an arrow L. In this case, each of the cylinder joints 202A and 202B are pivoted by support shafts 204. Therefore, as shown in FIG. 33, by utilizing bending caused by this pivoting motion, the drive units D1, D2, . . . , can move along a moving path 226 having inclined, horizontal, and vertical wall surfaces s, f, and v while changing its form in accordance with the respective surfaces s, f, and v or can travel over obstacles. In this case, if a ferromagnetic material such as iron is used as the moving surface of the moving path 226, the drive units D1, D2, . . . , can be attracted to the moving surface by a magnetic force of the movable magnetic pole 2 and can be moved while being kept attracted thereto.

As described above, according to the embodiment shown in FIGS. 28(A) to 33, the linear displacement can be extracted from rotary motion obtained by the motor and used as a drive force in a given direction. Therefore, without a motion converting means comprising a rotary body such as a wheel or a gear, the moving body can be moved along the moving path while changing its form by extension/contraction of the flexible joint member in accordance with a form of the moving path.

The present invention is not limited to the above embodiments but includes proper combinations thereof. In addition, it is a matter of course that various applications and modifications can be made.

For example, in FIG. 2, the movable magnetic pole is supported on the frames F1 and F2 by the flexible shaft 8 comprising a coil spring. However, as shown in FIG. 34, the flexible shaft may be constituted by a rod-like spring 8A which extends through the movable magnetic pole 2.

In this case, both ends of the rod-like spring 8A are guided by guide members G1 and G2, provided at frames F1 and F2, and capable of sliding along a longitudinal direction of the rod-like spring 8A.

What is claimed is:

1. An electromagnetic motor comprising:
   a movable member magnetized to form N and S poles on opposing surfaces;
   a flexible support member, one end of which is connected to said movable member, and the other end of which is connected to a base;
   a first fixed magnetic pole so arranged as to apply a magnetic force in a direction parallel to said N and S poles of said movable member;
   a second fixed magnetic pole so arranged as to apply a magnetic force in a direction perpendicular to said N and S poles of said movable member; and
   a control means for controlling the magnetic coupling between said first and second fixed magnetic poles and said N and S poles of said movable member, whereby controlling the magnetic force of said first and second fixed magnetic poles consequently controls the movement of said movable member.

2. The electromagnetic motor according to claim 1, wherein said flexible support member comprises a member capable of extension and contraction and is positioned at both sides of said movable member.

3. The electromagnetic motor according to claim 1, wherein said flexible support member is a coil spring.

4. The electromagnetic motor according to claim I, wherein said flexible member comprises a leaf spring member positioned at both sides of said movable member, one end of said leaf spring member away from said movable member being slidably supported by a bearing member fixed on said base, 5. The electromagnetic motor according to claim 1, wherein said first and second fixed magnetic poles are arranged such that the magnetic forces of said first and second fixed magnetic poles are perpendicular to each other and act on said movable member.

6. The electromagnetic motor according to claim 1, wherein each of said first and second fixed magnetic poles is constituted by an electromagnet around which a drive coil is wound, and a drive current having a specific phase angle is flowed through said drive coil so that an attracting force or a repulsing force acts on said movable magnetic pole.

7. The electromagnetic motor according to claim 6, wherein said drive current has a value capable of rotating said movable magnetic pole.

8. The electromagnetic motor according to claim 7, further comprising a moving member, arranged midway along a track of rotary motion of said movable member, for engaging with said movable member to move said movable member in one direction.

9. The electromagnetic motor according to claim 8, wherein said moving member is a linear body.

10. The electromagnetic motor according to claim 8, wherein said moving member is a rotary body.

11. The electromagnetic motor according to claim 8, wherein a friction increasing member is mounted at a portion of said movable member which engages with said moving member.

12. The electromagnetic motor according to claim 1, wherein said movable member is a permanent magnet.

13. The electromagnetic motor according to claim 1, wherein said movable member is an electromagnet.

14. A conveyor apparatus comprising a plurality of electromagnetic motors aligned around a moving member, each of said motors comprising:
   a movable member magnetized to form N and S poles on opposing surfaces;
   a flexible support member, one end of which is connected to said movable member, and the other end of which is connected to a base;
   a first fixed magnetic pole, fixed on said moving member, so arranged as to apply a magnetic force in a direction parallel to said N and S poles of said movable member;
   a second fixed magnetic pole, fixed on said moving member, so arranged as to apply a magnetic force in a direction perpendicular to said N and S poles of said movable member; and
   a control means for controlling the magnetic coupling between said first and second fixed magnetic poles and said N and S poles of said movable member, whereby controlling the magnetic force of said first and second fixed magnetic poles consequently controls the movement of said movable member
   wherein said moving member is moved in one direction by rotary motion of said movable member.

15. The apparatus according to claim 14, wherein said moving member is a linear body.

16. The apparatus according to claim 14, wherein said moving member is a rotary body.

17. The apparatus according to claim 14, wherein a friction increasing member is mounted at a portion of said movable member which engaged with said moving member.

18. A movable apparatus comprising:
   a plurality of electromagnetic motors; and
   joint members for coupling said motors;
   each of said motors comprising:
   a movable member magnetized to form N and S poles on opposing surfaces;
   a flexible support member, one end of which is connected to said movable member, and the other end of which is connected to a base;
   a first fixed magnetic pole so arranged as to apply a magnetic force in a direction parallel to said N and S poles of said movable member;
   a second fixed magnetic pole so arranged as to apply a magnetic force in a direction perpendicular to said N and S poles of said movable member; and
   a control means for controlling the magnetic coupling between said first and second fixed magnetic poles and said N and S poles of said movable member whereby controlling the magnetic force of said first and second fixed magnetic poles consequently controls the movement of said movable member
wherein said first and second fixed magnetic poles are connected to said joint members; and
said movable magnetic pole is brought into contact with a path surface on which said movable magnetic pole is to be moved by rotary motion of said movable magnetic pole, thereby moving an entire apparatus.

19. The apparatus according to claim 18, wherein a portion of said movable magnetic pole to be brought into contact with said moving path surface has a recessed portion or a projecting portion, and a path surface to be engaged with said recessed or projecting portion is formed to have a shape corresponding to a shape of said recessed or projecting portion.

20. The apparatus according to claim 18, wherein said moving path is constituted by a magnetic material.

21. The apparatus according to claim 18, wherein said joint member has a structure capable of extension and contraction.

22. A transporting apparatus comprising a plurality of electromagnetic motors are arranged on a base,
each of said motors comprising:
a movable member magnetized to form N and S poles on opposing surfaces;
a flexible support member, one end of which is connected to said movable member, and the other end of which is connected to a base;
a first fixed magnetic pole so arranged as to apply a magnetic force in a direction parallel to said N and S poles of said movable member;
a second fixed magnetic pole so arranged as to apply a magnetic force in a direction perpendicular to said N and S poles of said movable member; and
a control means for controlling the magnetic coupling between said first and second fixed magnetic poles and said N S poles of said movable member whereby controlling the magnetic force of said first and second fixed magnetic poles consequently control the movement of said movable member
wherein an object to be conveyed along said movable member is moved in one direction by rotary motion of said movable magnetic pole.

23. An apparatus according to claim 22, wherein a friction increasing member is mounted at a portion of said movable member which engages with the object to be conveyed.

* * * * *

UNITED STATES PATENT AND TRADEMARK OFFICE
CERTIFICATE OF CORRECTION

PATENT NO. : 4,801,829

DATED : January 31, 1989

INVENTOR(S) : Baba

It is certified that error appears in the above-identified patent and that said Letters Patent is hereby corrected as shown below:

On the title page after Abstract "23 drawing sheets" should read --21 drawing sheets--.

| | | |
|---|---|---|
| col. 04, line 49 | delete "ad" | insert --and-- |
| col. 13, line 08 | after "movable" | insert --magnetic-- |
| col. 14, line 57 | after "dipolar" | delete "," |
| col. 15, line 02 | delete "supplies" | insert --is arranged to supply-- |

Signed and Sealed this

Twenty-sixth Day of February, 1991

*Attest:*

HARRY F. MANBECK, JR.

*Attesting Officer*    *Commissioner of Patents and Trademarks*